US007376548B2

(12) United States Patent
Sinclair

(10) Patent No.: US 7,376,548 B2
(45) Date of Patent: May 20, 2008

(54) METHODS AND APPARATUS FOR SIMULATING INDUSTRIAL PROCESSES

(75) Inventor: Andrew Sinclair, Amersham (GB)

(73) Assignee: BioPharm Services Limited, Buckinghamshire (GB)

( * ) Notice: Subject to any disclaimer, the term of this patent is extended or adjusted under 35 U.S.C. 154(b) by 1302 days.

(21) Appl. No.: 09/858,235

(22) Filed: May 17, 2001

(65) Prior Publication Data

US 2002/0035465 A1    Mar. 21, 2002

(30) Foreign Application Priority Data

May 17, 2000   (GB)   ................................. 0011924.8

(51) Int. Cl.
G06F 9/455 (2006.01)
G05B 11/01 (2006.01)
G06F 19/00 (2006.01)

(52) U.S. Cl. ........................... 703/22; 700/14; 700/108
(58) Field of Classification Search ................. 703/22, 703/9; 700/97, 115, 108, 14
See application file for complete search history.

(56) References Cited

U.S. PATENT DOCUMENTS

| | | | | |
|---|---|---|---|---|
| 4,888,692 A | * | 12/1989 | Gupta et al. | 700/96 |
| 5,148,370 A | * | 9/1992 | Litt et al. | 700/104 |
| 5,229,948 A | * | 7/1993 | Wei et al. | 700/99 |
| 5,255,181 A | * | 10/1993 | Chapman et al. | 705/8 |
| 5,260,868 A | * | 11/1993 | Gupta et al. | 700/100 |
| 5,291,394 A | * | 3/1994 | Chapman | 705/8 |
| 5,351,195 A | * | 9/1994 | Sherman | 700/100 |
| 5,369,570 A | * | 11/1994 | Parad | 705/8 |
| 5,433,865 A | * | 7/1995 | Laurent | 210/727 |
| 5,666,297 A | | 9/1997 | Britt et al. | |
| 5,687,090 A | | 11/1997 | Chen et al. | |
| 5,748,478 A | * | 5/1998 | Pan et al. | 700/99 |

(Continued)

FOREIGN PATENT DOCUMENTS

GB    2 340 971 A    3/2000

(Continued)

OTHER PUBLICATIONS

Mazziotti et al, "Creating a Flexible, Simulation-Based Finite Scheduling Tool", Proceedings of the 1997 Winter Simulation Conference, pp. 853-860, Dec. 7-10, 1997, Atlanta, Georgia.*

(Continued)

Primary Examiner—David Vincent
Assistant Examiner—Tom Stevens
(74) Attorney, Agent, or Firm—Finnegan, Henderson, Farabow, Garrett & Dunner, L.L.P.

(57) ABSTRACT

In order to design and implement industrial processes in an efficient manner, an apparatus (1) is provided which can simulate a process to be implemented. The processing of the simulation is controlled by a modelling module (17) and is arranged to cause the constraints on scheduling batches in the simulation to correspond to the constraints in actual processing where mixing of batches initiated at different times is avoided. This is achieved by the modelling module (17), whenever a batch is initiated in the simulation, scheduling the following batch to be initiated, the greatest of either the maximum time items of equipment require to process the batch initiated if no delays occur within the system or the greatest time for processing batches of items equipment currently in use.

49 Claims, 14 Drawing Sheets

U.S. PATENT DOCUMENTS

| | | | |
|---|---|---|---|
| 5,809,490 | A | 9/1998 | Guiver et al. |
| 5,877,954 | A | 3/1999 | Klimasauskas et al. |
| 5,993,041 | A | 11/1999 | Toba |
| 6,311,095 | B1 * | 10/2001 | Brown .................. 700/117 |
| 6,466,898 | B1 * | 10/2002 | Chan ....................... 703/17 |
| 6,546,300 | B1 * | 4/2003 | Fukuda et al. .......... 700/100 |
| 6,782,295 | B2 * | 8/2004 | Martz et al. ............ 700/28 |
| 6,983,229 | B2 * | 1/2006 | Brown ...................... 703/6 |
| 7,043,414 | B2 * | 5/2006 | Brown .................... 703/12 |
| 7,123,978 | B2 * | 10/2006 | Hartman et al. ........ 700/108 |

FOREIGN PATENT DOCUMENTS

| | | |
|---|---|---|
| JP | 8-187648 | 7/1996 |
| WO | WO 98/37504 | 8/1998 |

OTHER PUBLICATIONS

Berstein et al., "A Simulation—based Decision Support System for a Specialty Chemicals Production Plant" 1992 Winter Simulation Conference 1992; pp. 1262-1270.*

Faceenda et al., "A Combined Simulation/Optimization Approach to Process Plant Design" 1992 Winter Simulation Conference pp. 1256-1261.*

Roberts et al., "Object Oriented Simulation Tools Necessary For a Flexible Batch Process Management Architecture" 1999 Winter Simulation Conference p. 323-330.*

Weaver et al., "Monitoring and Control Using the Internet and Java" 1999 IEEE p. 1152-1158.*

Tyo, J., "Simulation Modeling Tools", http://techweb.cmp.com/iwk, http://www.informationweek.com/535/35oltoo.htm, pp. 1-8, (Jul 10, 1995).

American National Standard, "Batch Control, Part 1: Models and Terminology", ANSI/ISA-S88.01-1995, pp. 1-95, (Oct. 23, 1995).

Image That, Inc., "Extend; Simulation Software for the Next Millennium", Extend User's Manual Version 4 for Macintosh or Windows, http://www.imaginethatinc.com, 3 pages, (1997).

* cited by examiner

METHODS AND APPARATUS FOR SIMULATING INDUSTRIAL PROCESSES

The present invention relates to methods and apparatus for performing industrial processes in an efficient manner. In particular, embodiments of the present invention concern methods and apparatus for designing and performing industrial microbiological processes, in a manner in which enables apparatus used in the processes to be used efficiently.

Whenever a production line is in use, it is commercially important that apparatus is used efficiently to maximise output. Whilst, the capacity of a production line is ultimately limited by the apparatus available, careful scheduling of the use of equipment can maximise the efficiency of a production line once apparatus for the production line have been selected.

Method and apparatus exist to enable industrial processes to be simulated in order to aid designers designing new plants and adapting existing plant. The simulation of an industrial process can enable bottle necks within production facilities to be identified prior to actual implementation and thereby enable changes to be made to maximise the use of available equipment.

In particular by simulating the timing and processing of batches of materials through a simulated production line, data can be generated which identifies how real batches should be scheduled within an actual production line so that use of equipment is maximised. Furthermore, simulations of industrial processes enable equipment to be selected so that the capacities of different items of equipment complement one another thereby ensuring that in a real production line corresponding to the simulation the use of all items of equipment can be maximised.

In productions lines for certain materials, notably microbiological materials and some chemicals, it is important that the total processing time of a batch of material as it passes through a plant between defined hold points is minimised. In the case of biological and microbiological materials this constraint rises due to the limited shelf life of live microbiological materials and their products and the need to ensure that any material produced by a plant is substantially free from other contaminants. Since processing time is of such critical importance, many standard techniques for maximising the efficiency of equipment within a plant cannot be applied to industrial microbiological processes. In particular, when extracting or purifying microbiological products, batches of product initiated at different times cannot be consolidated into a single batch later on in a manufacturing process other than at defined hold points where a product is stable since the mixing of products gives rise to the possibility that an unacceptance level of contamination might occur.

There is therefore a need for a modelling system which is adapted to address the requirements of industrial processes in which queues and consolidation occurs only at defined points within a process. Such a modelling system can then be utilized to simulate such processes and enables the scheduling of batches and the capacities of equipment to be selected so that the industrial processes corresponding to the simulation can be efficiently performed.

In accordance with one aspect of the present invention there is provided a method of simulating an industrial process comprising the steps of:

for a plurality of items of equipment, determining a respective current cycle time for each said item of equipment;

for a batch of product to be processed utilizing said items of equipment, determining a minimum cycle time for each of said items of equipment for processing said batch;

determining the greatest cycle time of said current cycle times for each of said items of equipment, and said minimum cycle times for said batch; and scheduling the initiation of the batch following the current batch to occur after a period of time corresponding to said determined greatest cycle time.

By determining for an industrial process the greatest of the cycle times for items of equipment within a production line and the minimum processing time for a new batch and then scheduling the initiation of a new batch after the determined greatest cycle time, a means is provided to ensure that the processing of a product using equipment having the greatest cycle time is scheduled to occur separately for different batches of products. When an industrial process corresponding to that simulated is performed, the batches of material being processed are then scheduled corresponding to the scheduling within the model and in this way the mixing of different batches and the formation of queues within a system is avoided.

Although simulation tools are known which enable production lines to be designed or modified so that processes corresponding to those simulated are performed in an efficient manner, such design tools normally only enable the size and timing of simulated batches and the size and capacity of simulated equipment to be varied. Although the variation of such parameters and simulation of processes enables the size and timing and size and capacity of bathes and equipment on an actual production line to be set to increase the efficiency of a corresponding process other factors can limit the efficiency of an actual production line.

In particular, in many known methods and apparatus for simulating industrial processes, no attempt is made to model support services needed to implement a main process. In general, this is because the demand for external utilities such as water and electricity can be assumed to be such that for most processes, the availability of utilities does not place constraints what processing may be undertaken. However, the applicants have appreciated that in the case of specialised processes this assumption is not necessarily true.

In particular, where, as is the case of industrial biological processes, many steps involve the use of utilities generated on site such as e.g. purified water, water injection (WFI), clean steam etc., the availability of on site generated utilities can act to limit site output and therefore need to be modelled. The modelling of on-site utilities can then identify the requirements for generation and storage of such specialised utilities or enable processes to be rescheduled or varied to ensure that utility capacity does not limit production efficiency. The resultant data on simulated production lines can then be utilised to select production facilities or schedule processing within a real plant.

Where support services are modelled, it is important that modelling can determine times of the demand so that the peak demand can be determined and controlled if necessary. It is possible to model supply and demand for a utility by way of a continuous model in which the instantaneous demand for a utility is determined. However, where an industrial process is a combination of processing steps only some of which require subsidiary services, the processing of such a continuous model for the entirety of the system is computationally complex and therefore reduces the speed of the simulation or requires an increase in computer overhead.

In accordance with a further aspect of the present invention, there is provided a method of simulating an industrial process comprising the steps of:

classifying for each of a plurality of process steps in a process to be modelled, a first group of process steps whose processing is dependent upon utilities which are to be modelled, and a second group of process steps whose processing is not dependent upon utilities which are to be modelled;

associating with all of said process steps a completion condition for completing each said process step and data indicative of whether each said process step is currently active;

associating with each of said process steps in said second group, rate data indicative of the rate of utility use of a utility for a predetermined time period to be modelled as part of said process steps; and step wise modelling said industrial process and said utilities using said rate data, wherein said each modelling step comprises the steps of:

determining whether any active process steps to be modelled are associated with rate data;

determining the shortest time period required to fulfil the completion condition associated with any active process step; and updating a model of said industrial process utilizing said predetermined time period if at least one active process is associated with rate data and said predetermined period is smaller than said determined period; and updating said model utilizing said determined time period if no active processes are associated with rate data or said determined time period is shorter than said predetermined period.

Further aspects and embodiments of the present invention will become apparent with reference to the accompanying description and drawings in which.

The present application concerns the design and implementation of industrial processes. In particular, in one aspect the present application concerns the design and implementation of industrial processes in which bottlenecks and delays due to lack of resources can be reduced and equipment is efficiently used.

In accordance with an embodiment of the present invention, initially a model corresponding to a process to be implemented is created, utilizing input batch parameters and equipment parameters. A simulation of the process is then effected. In the simulation, the use of equipment, processing of batches and demand for resources are determined within the simulation and an appropriate schedule for timing of the initiation of batches is calculated. After a number of simulations have been run an industrial process corresponding to a simulated process is then be implemented by providing equipment corresponding to the simulated equipment parameters and processing actual batches corresponding to simulated batches in accordance with the generated schedule for the initiation of batches corresponding to the simulation which output data indicates will run efficiently.

Figure 1:
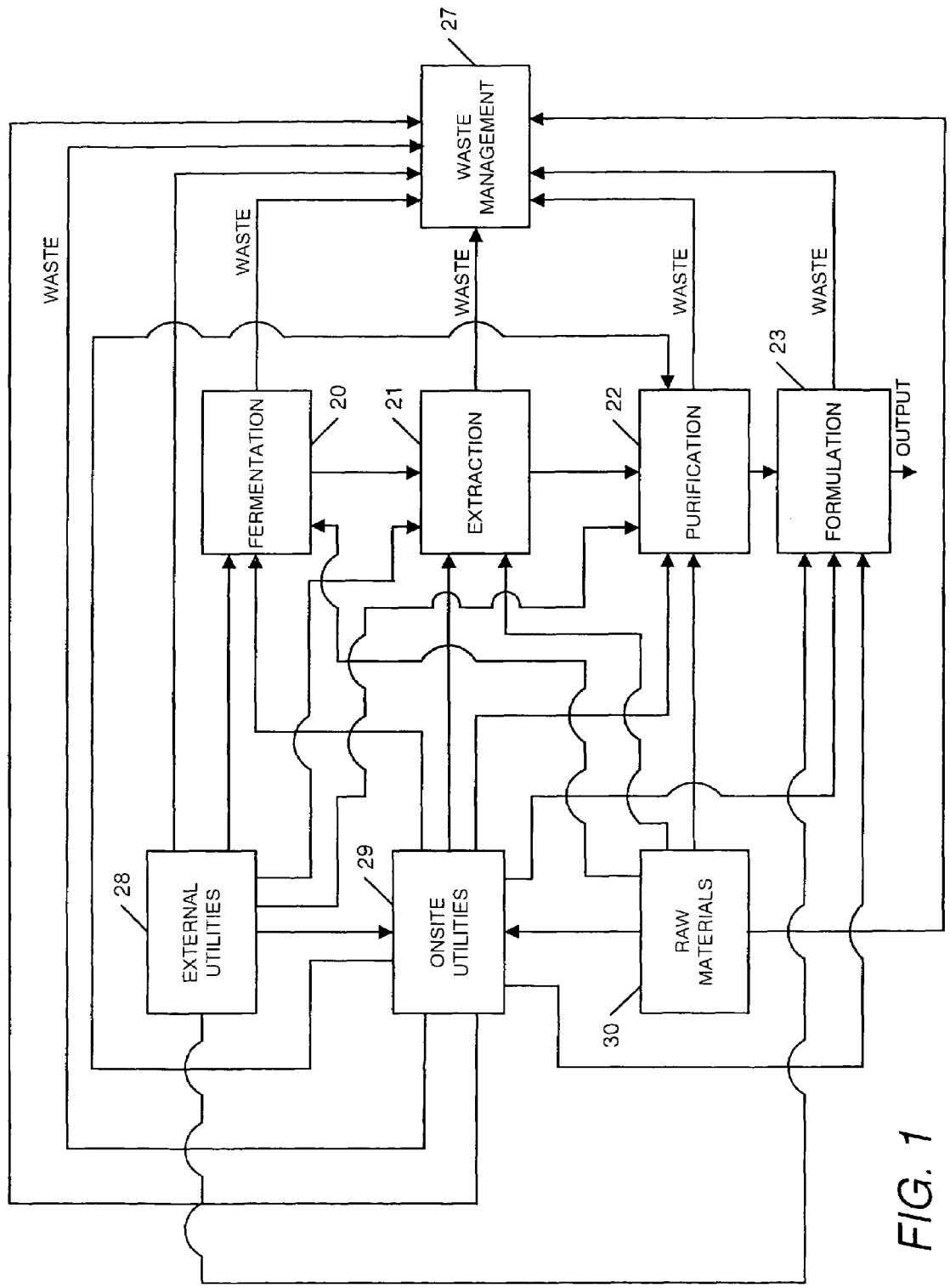
FIG. 1 is a block diagram of an exemplary industrial process.

An illustrative example of a process which can be modelled utilizing the present invention will now be described with reference to FIG. 1.

In this example an illustrative process for generating biological material is shown comprising a fermentation process 20 which causes a biological material to be grown followed by an extraction process 21, a purification process 22 and a formulation process 23 which results in an output being the desired biological material. These processes 20-23 in this example occur using different equipment. The fermentation process 20, the extraction process 21, purification process 22 and formulation process 23 all result in the generation of waste which needs to be processed by means of waste management process 27.

In this example, the fermentation process 20, the extraction process 21, purification process 22 and formulation process 23 and the waste management process 27 all require support services. These support services comprise external utilities 28 such as electricity for heating products, on-site utilities 29 such as purified water, water suitable for injection (WFI) which needs to be generated and raw materials 30 such as media components for fermentation and raw chemicals used in purification which can be mixed with on-site generated utilities such as generated water for injection (WFI) to make the media used in fermentation and buffers used in purification. Cleaning solutions for cleaning the equipment used to perform the fermentation process 20, the extraction process 21, purification process 23 and formulation process 23 so that the equipment used in those steps may be used to create further batches of biological material is also generated from raw cleaning chemicals and purified water. Alternatively steam sterilisation is used using on-site purified water to prepare production equipment for processing a further batch of material.

In order to arrange the scheduling of batches through the processes 20-23 and select equipment for performing the processes 20-23, in a way in which use and speed of precessing is increased, initially the processes are modelled in a manner which will be described in detail later.

In order to model the processing of batches of material as they pass through the fermentation process 20, the extraction process 21, the purification process 22 and the formulation process 23 it can be sufficient that external utilities such as electricity and mains water are considered to be continuously available. However, for specialised utilities such as water for injection or cleaning solutions utilizing water for injection, availability of these cleaning solutions or any other on-site utilities may limit processing rates. Therefore, for a more complete model the demands for these on-site utilities are also modelled so that appropriate equipment for generating and storing such utilities can be determined.

The timing of demands for external utilities 28, on-site utilities 29 and raw materials 30 is determined by the manner in which batches of products are scheduled for processing through the fermentation process 20, the extraction process 21, the purification process 22 and the formulation process 23. In the case of biological materials in addition to constraints on the basis of availability of on-site utilities 29 and the availability of equipment for performing fermentation, extraction, purification and formulation, a further constraint on how production of material is scheduled arises due to the need to ensure that no mixing of different batches occurs during fermentation and consolidation of batches only occurs at defined hold points in the purification stages so that any excessive build up of impurities within the biological product is avoided. Thus in this example, this would require that whenever a new batch was to be processed by the fermentation process 20, the equipment for processing the next batch was available for use. However, the rate at which batches progress through the process is also dependent on availability and demand for on-site utilities 29. It therefore necessary to establish a suitable schedule for initiating new batches.

This constraint is also modelled within the simulation of the processes.

Thus by providing apparatus for simulating the processes 20-23 in accordance with input data defining the batches of material and capacities of equipment utilised to implement the processes 20-23, a means is provided by which the effect of varying batches and equipment within the actual processes can be determined. In particular, by utilizing a number of different sets of input data and outputting for each simulation data identifying the use of equipment and quantities of utilities used a means is provided to enable the selection of appropriate equipment to effect the process modelled.

FIRST EMBODIMENT

Apparatus for generating data identifying the use of equipment and quantities of utilities for modelled processes utilizing equipment corresponding to defined input parameters in accordance with an embodiment of the present invention will now be described.

Figure 2:
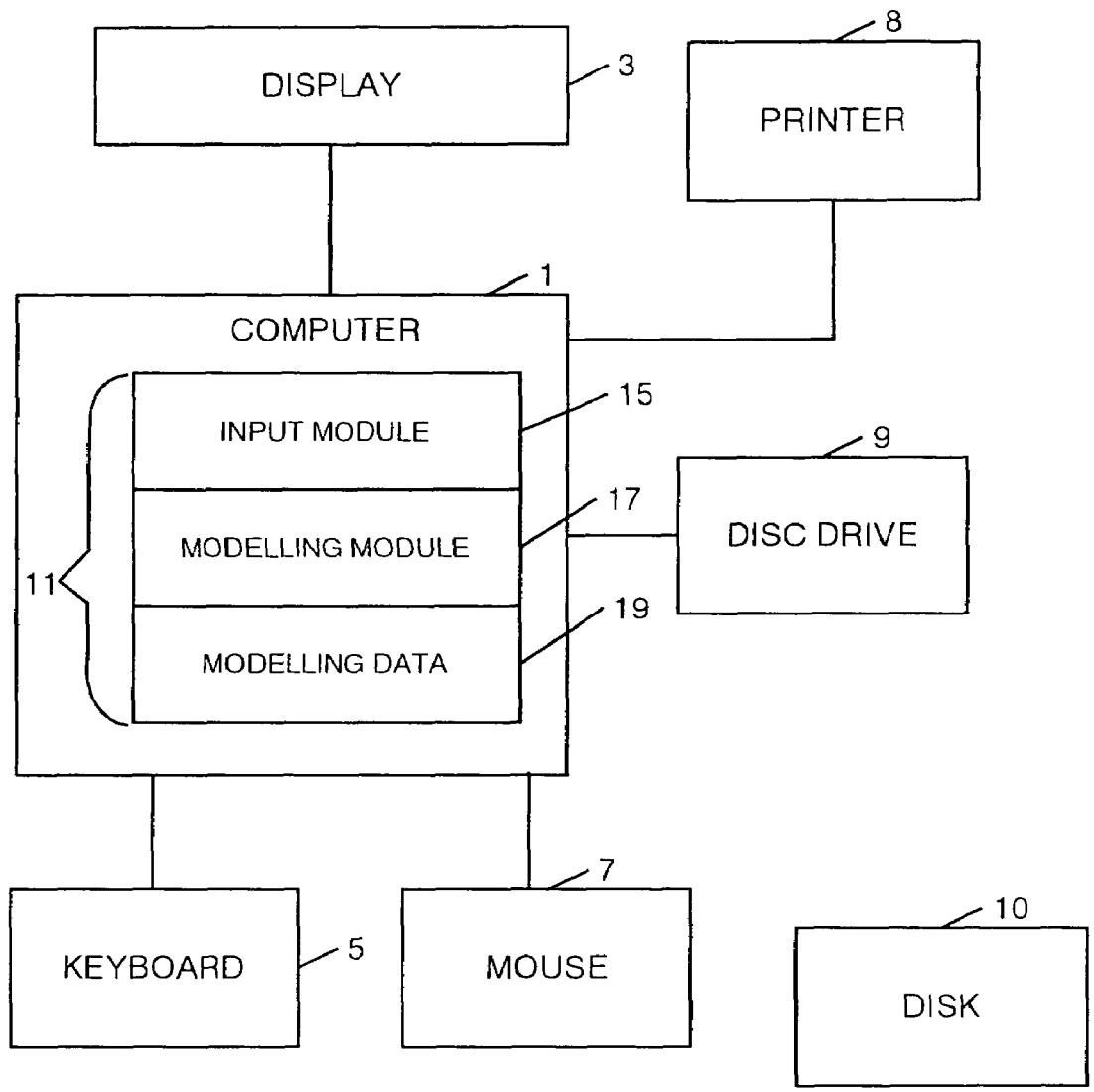
FIG. 2 is a block diagram of an apparatus in accordance with a first embodiment of the present invention.

FIG. 2 is a block diagram of a computer apparatus embodying the present invention. The computer apparatus comprises a conventional computer 1 that is connected to a display 3, a keyboard 5 and a mouse 7. The computer 1 is also connected to a printer 8 and a disc drive 9. The disc drive 9 is arranged to receive a disc 10 having a computer program stored thereon which causes a copy of the computer program to be stored within the memory 11 of the computer 1.

In this embodiment the computer program stored within the memory 11 comprises an input module 15 for inputting data representative of a model of an industrial process; and a modelling module 17 for simulating the processing of products through a process utilizing the model data input using the input module 15. The memory 11 also is arranged to store modelling data 19 being data input utilizing the input module 15 and data generated by the modelling module 17.

In use, after the input module 15 and modelling module 17 have been stored in memory 11, a user inputs model data using the input module 15, the keyboard 5 and the mouse 7. Data input via the keyboard 5, mouse 7 is then processed by the input module 15 and stored as modelling data 19. An industrial process can then be simulated using the modelling data 19 in accordance with the modelling module 17. Generated output data is then stored within the memory 11 and after the simulation has been completed results are displayed on the display 3. The generated output data can then be printed out in hard copy format by the printer 8.

The modelling in accordance with the present invention is such to enable support services such as on site utilities and waste processing and production rules to be modelled. In particular, the present invention enables continuous models of utilities identifying instantaneous demand for utilities to be incorporated within discrete models of other processes. This is achieved by the modelling module 17 determining for each step within a model, firstly whether any continuous processes are to be modelled and then utilizing a suitable time increment for the model by selecting the smaller time increment of either the minimum time required to complete an active process or a default time increment. If no continuous processes are determined to be active the minimum time required to complete an active process is used as a time increment.

Thus in this way, whenever only discrete processes i.e. processes not modelling instantaneous demand for a utility are being modelled, time periods corresponding to the minimum time periods to complete processes are used so that the total number of steps involved in a model is minimised. However, a default time period is used to break down processes which are to be modelled as continuous processes into a number of steps so that an approximation of instantaneous demand for utilities may be determined.

Furthermore, in this embodiment of the present invention a system is provided for simulating and modelling the scheduling the initiation of batches within a model to comply with the constraints of an industrial process in which mixing of batches is avoided. In this embodiment, this is achieved by determining whenever a batch is initialised within specified portions of a simulation where queuing and consolidation constraints arise, a time period for initiating the next batch which corresponds to the longest cycle period for any item of equipment utilized in the process modelled. This longest cycle period is either selected from the current times for equipment currently in use or from estimates of the minimum cycle times for the next batch. Thus in this way a means is provided for ensuring that within the simulation no batches ever are mixed and queues within the model are minimised during the simulation of fermentation stages ad limits consolidation to defined hold points in the purification stages.

Exemplary data structures for storing modelling data 19 in accordance with this embodiment of the present invention will now be described with reference to FIGS. 3 to 11.

Figure 3:
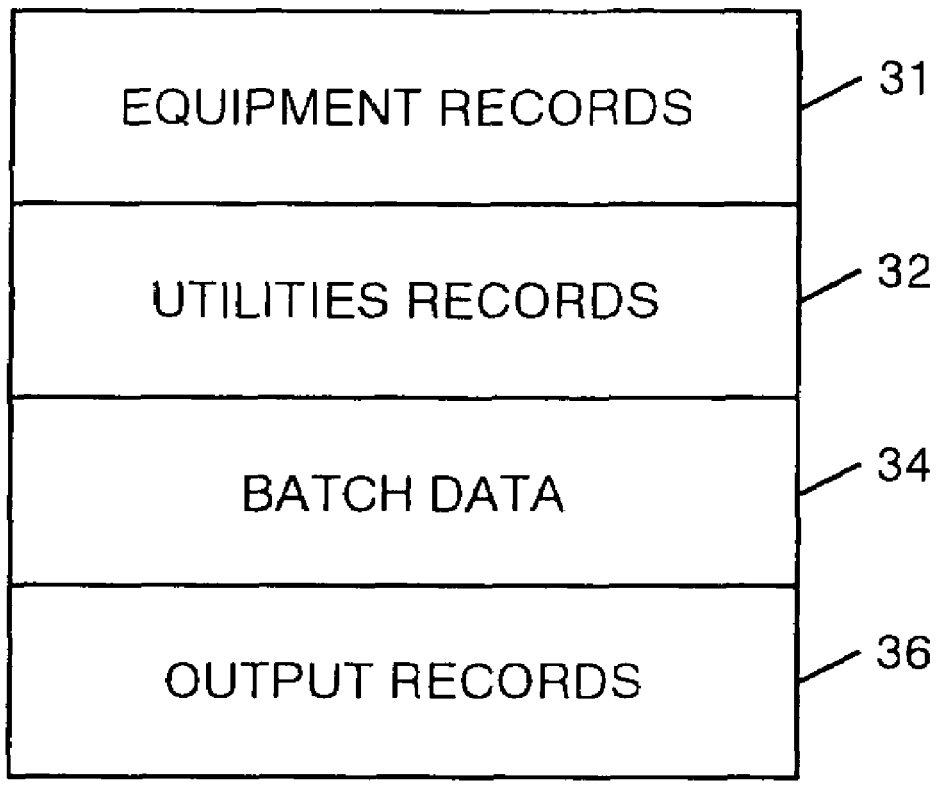
FIG. 3 is a block diagram of modelling data.

FIG. 3 is a block diagram of modelling data 19 stored within the memory 11 of the computer 1. The modelling data 19 comprises data input via the input module 15 defining processes and equipment to be modelled together with data generated by the modelling module 17 utilizing the input data.

In this embodiment the modelling data 19 comprises a plurality of equipment records 31 defining the manner in which products can be processed by a plurality of items of equipment to be simulated; a plurality of utilities 32 records utilized to simulate the generation and use of each of a plurality of on-site utilities; batch data 34 comprising data defining the parameters of batches of product as they pass through an industrial process and data defining how the batches are to be scheduled to ensure that no mixing of different batches occurs as will be described in detail later; and a plurality of output records 36 comprising data indicating the times at which individual items of equipment defined by the equipment records 31 are in use and the available levels of generated utility identified by the utilities records 32 at any time throughout the simulation.

In this embodiment the equipment records 31 comprise a plurality of records each defining an item of equipment in terms of physical parameters for the equipment and the different processes which take place using that equipment. Thus for example a chromatography column for purifying a component of interest, in this embodiment is defined in terms of physical parameters such as volume and circumference, and a plurality of processes such as packing, loading, elution and cleaning which are undertaken using the equipment.

Also stored as part of an equipment record is status data indicative of whether as part of the simulation the equipment is in use and cycle time data indicating the total amount of time an item of equipment has been processing an individual batch and the time previously taken to process a batch become available for the processing of the next batch which is used to determine scheduling data for batches which avoids the build up of queues within the system as will be described in detail later.

Exemplary data structures for the equipment records 31, utilities records 32, batch data 34 and output data 36 will now be described in detail with reference to FIGS. 4 to 11.

Figure 4:
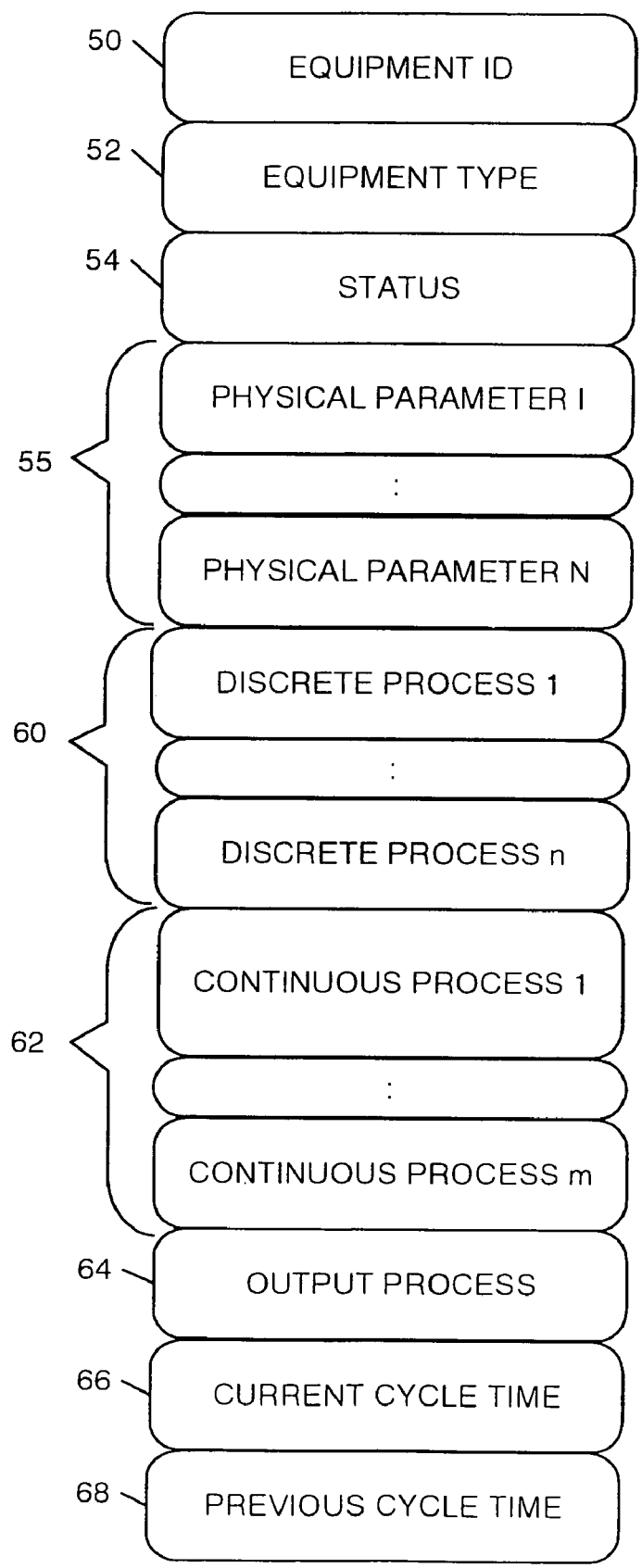
FIG. 4 is a block diagram of an exemplary data structure for an equipment record.

FIG. 4 is a block diagram of an exemplary data structure for an equipment record. In this embodiment the equipment records each comprise equipment identification data 50; equipment type data 52 indicative of an equipment type e.g. a chromatography column, a holding vessel etc, status data 54 identifying whether the equipment is in use at a certain time within a simulation, a number of physical parameters 55 for example volume and circumference, a number of discrete process records 60 and a number of continuous process records 62 identifying the processes which are undertaken using the equipment as will be described later; an output process record 64, current cycle time data 66 and previous cycle time data 68 which is used for determining the scheduling of batches of products within the simulation as will be described in detail later.

The equipment identification data 50 enables an item of equipment to be identified so that its usage within the model may be monitored. The equipment identification data 50 also enables batches of products to be routed to specific pieces of equipment within a model. The equipment type data 52 identifies the sort of equipment that is intended to be modelled and enables batches of products to be routed to equipment of a specific type rather than to a specific item of equipment. Thus for example where a product is to be temporarily stored in a suitable holding vessel any available vessel might be used to store the product. Therefore, in a model of such a process a batch would be directed to an item of equipment associated with equipment type holding vessel, rather than a predefined item of equipment.

Figure 5:
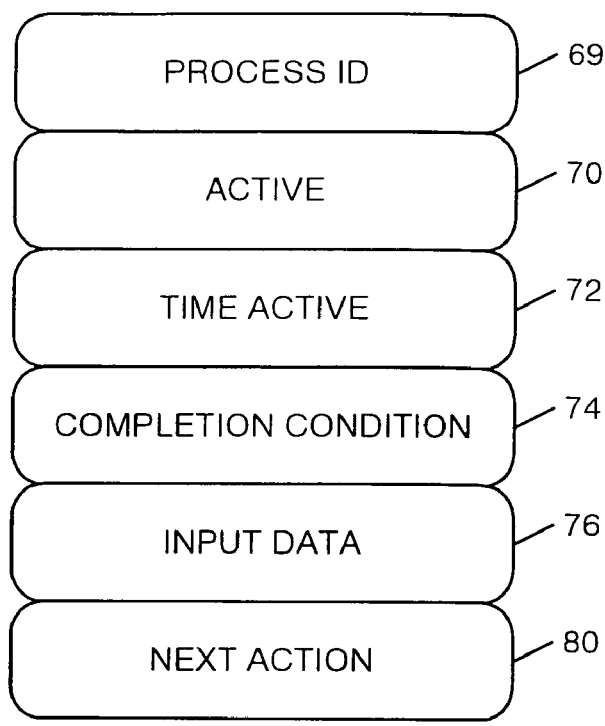
FIG. 5 is a block diagram of an exemplary data structure for a discrete process record.

FIG. 5 is a schematic block diagram of an exemplary data structure for a discrete process record 60 in accordance with this embodiment of the present invention. The discrete process records each comprise process identification data 69, an active flag 70 indicating when within the model the process is taking place; time active data 72 indicating the total amount of time a process has been active; a completion condition 74 comprising data indicative of what conditions must occur within the model in order for the process modelled by the discrete process record to be considered to be complete; a set of one or more required inputs 76, and a next action field 80 identifying which processes in terms of process ID numbers 69 follow a further completion of the process simulated by the record or alternatively a null field indicating that the processing of an item of equipment is to end.

The completion condition 74 defines the conditions which must be fulfilled in order for the process to be considered complete. A simple example of a completion condition would be for the time active 72 for the process to be equal to a certain value. This would be a suitable completion condition 74 for a process having a fixed time span. More complicated completion conditions could comprise requirements for the time active 72 to be equal to a value calculated on the basis of batch parameters or physical parameters 55 for an item of equipment. The input data 76 defines the inputs necessary to be available in order for a discrete process to be initiated as will be described later.

Figure 6:
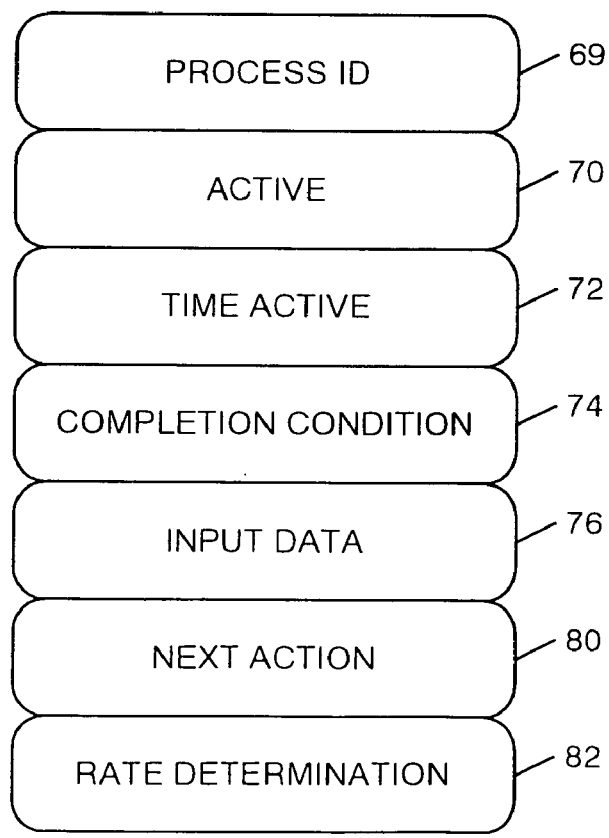
FIG. 6 is a block diagram of an exemplary data structure for a continuous process record.

FIG. 6 is a schematic block diagram of a data structure for a continuous process record. In this embodiment, the data structure for a continuous process record 62 is identical to the data structure for a discrete process record 60 and description of the data structure will be repeated except a continuous process record additionally includes rate determination data 82. The rate determination data 82 comprises data for converting a continuous model of a process defined in terms of rates of usage of utilities into data suitable for use with a discrete model and in this embodiment comprises data identifying the rate at which a utility is used which can be multiplied by a time increment to determine how much of a utility is used within a specified time period, as will be described in detail later.

Figure 7:
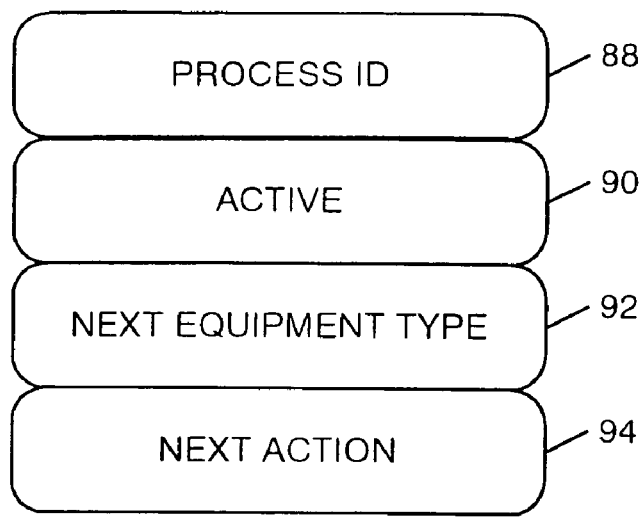
FIG. 7 is a block diagram of an exemplary data structure for an output process record.

FIG. 7 is a schematic block diagram of an exemplary data structure for an output process record 64. An output process record comprises a record indicative of a process where a batch of materials is transferred from one item of equipment to another. The output process record 64 comprises a process identification data 88; and an active flag 90 indicating that a batch material is waiting to be transferred from one item of equipment to another. The output process record 64 also comprises next equipment type field 92 and a next action field 94. The next equipment type field 92 is arranged to store data indicating the next item of equipment which is to be utilized to process a batch either in terms of specific equipment identification data 50 equipment type data 52. The next action field 94 is arranged to store process of identification data corresponding to the record within the discrete process records 60 or continuous process records 62 is to be performed after the processing of the batch has been completed or alternatively a null field indicating the processing by the equipment identified by the equipment record is complete.

The output process records 64, enables a specific type of process to be modelled namely storage of a batch within an item of equipment prior to transfer to another item of equipment. As the process comprises waiting for the availability of other equipment the next equipment field 92 implicitly defines the necessary condition complete the output process being modelled. Thus in the case of process modelled by an output process the next equipment type field 92 may be utilised in a similar way to the completion condition data 74 for a discrete 60 or continuous 62 process record as will be described in detail later.

Figure 8:
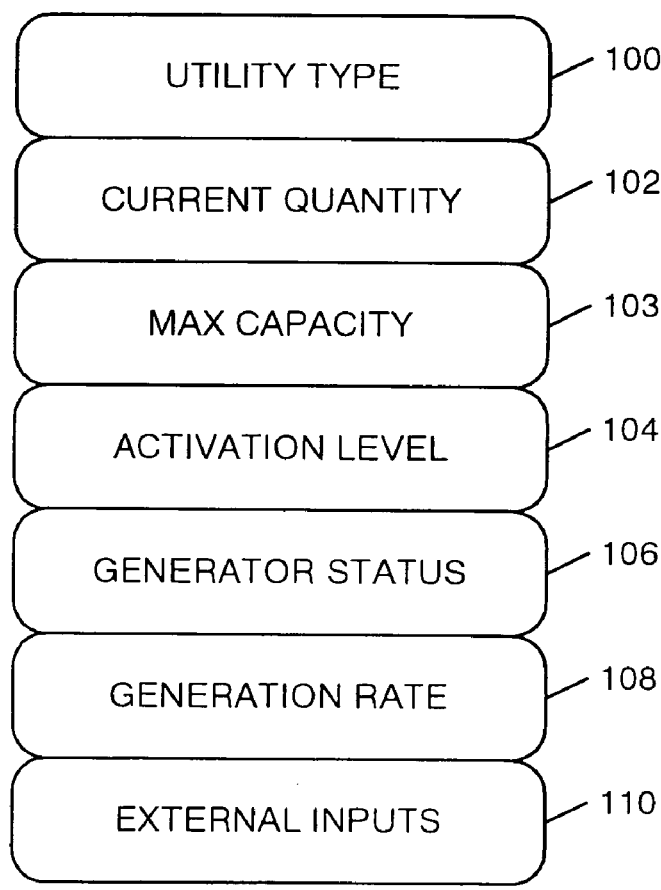
FIG. 8 is an exemplary block diagram of an exemplary data structure for a utility record.

FIG. 8 is a schematic block diagram of an exemplary data structure for a utility record 32. In this embodiment each utility record 32 comprises utility type data 100, current quantity data 102, maximum capacity data 103, activation level data 104, generator status data 106, generation rate data 108 and external input data 110.

The utility type data 100 identifies the type of utility to be modelled using the utility record 32. The current quantity data 102 identifies the current amount of utility available. The maximum capacity data 103 comprises data identifying the maximum amount of utility which can be stored, for example in a size of a holding tank for a utility. The activation level data 104 comprises data identifying a level below which the on site utility is to be generated thereby defining a control mechanism to be employed to maximise the availability of the utility. The generation rate data 108 comprises data identifying the rate at which an on site utility may be generated. The external inputs data 110 comprises data identifying required resources when the utility is generated.

In accordance with this embodiment of the present invention where a continuous process record has an active flag 70 indicating that the process is currently occurring the rate determination 82 associated with the continuous process record is utilized to reduce the quantity level 102 of an associated utility corresponding to the input required 76 for that record to reflect the use of a utility within an on-going process. Whenever the quantity level 102 associated with a particular utility type is determined to be beneath the activation level 104 for that utility the generator status 106 is amended to indicate that the utility is to be generated which then causes the current quantity 102 to be updated to account for generation of utility at the generation rate 108 provided required external inputs 110 are available. When the current quantity 102 is equal to the maximum capacity 104 the generation status 106 is amended to indicate that utility is no longer to be generated and the current quantity 102 is no longer increased on the basis of the generation rate 108. Thus in this way the generation and use of utilities can be modelled.

The applicants have also appreciated that the generation of waste by a process can be modelled in the same way in which a utility may be modelled. In particular, just as the generation and utilisation of a generated utility may be modelled, the available capacity of waste processing can be considered a form of negative utility which is created rather than used up by other processes and which needs to be processed to be removed rather than generated. However, in the same way in which available capacity and lack of available utilities effect the timing of processing in a main production line, similarly the available capacity and lack of available processing capacity of waste processing can also effect the timing of other processes.

Figure 9:
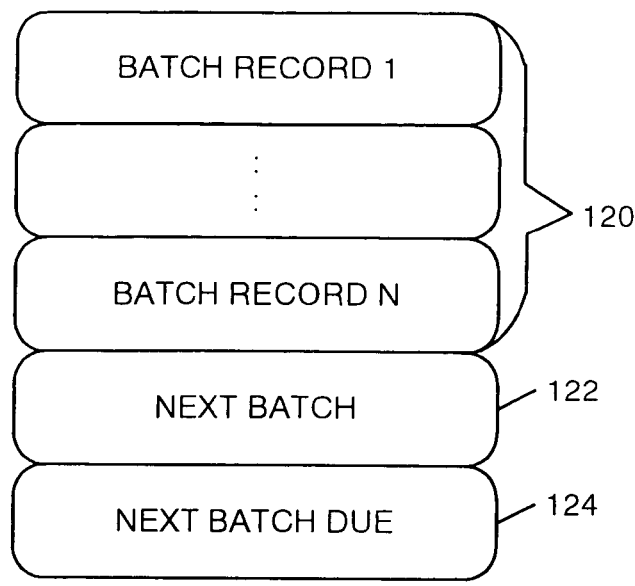
FIG. 9 is a block diagram of an exemplary data structure for batch data.

FIG. 9 is a block diagram illustrating an exemplary data structure for batch data 34 for use in accordance with this embodiment of the present invention. In this embodiment the batch data 34 comprises a plurality of batch records 115 comprising data identifying the content and processing of batches of products as will be described in detail below. The batch data also comprises a next batch pointer 117 indicating which of the batch records 115 is to be utilized as representing the next batch to be processed and a next batch due time 119 indicating when the next batch 117 is to be initiated relative to the current time, as will be described in detail later.

Figure 10:
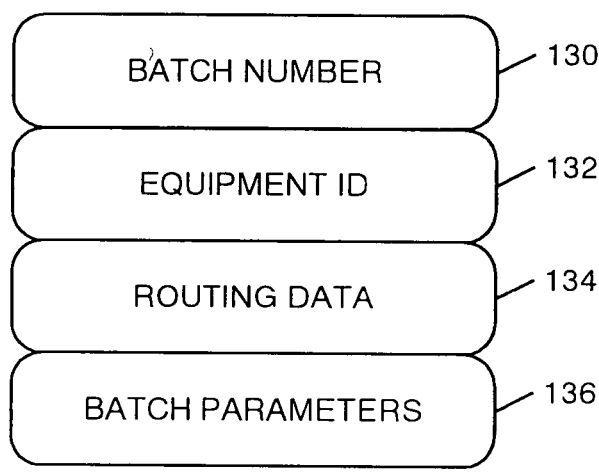
FIG. 10 is a block diagram of an exemplary data structure for a batch record.

FIG. 10 is a schematic block diagram illustrating an exemplary data structure for batch records 115 within the batch data 34. In this embodiment of the present invention the batch records 115 each comprise a batch number 130 enabling the batches to be identified, equipment identification data 132, identifying the equipment ID 50 of an item of equipment processing a particular batch; routing data 134 comprising data indicative of which items of equipment in terms of their equipment ID 50, a particular batch is to be processed by where this is defined in advance; and a set of batch parameters 136 comprising data identifying the product characteristics for example size and volume of package of a product etc., that is processed as part of the batch indicated by the batch record.

As will be described in detail later the batch data 34 is utilized to determine the order in which individual batches represented by the individual batch records 115 are initiated and the processing of batches is then determined by the routing data and batch parameters 134 associated with that batch.

Figure 11:
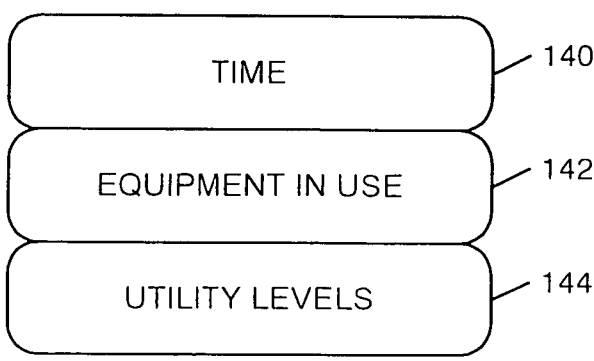
FIG. 11 is a block diagram of an exemplary data structure for output data.

FIG. 11 is a schematic block diagram of an exemplary data structure for output record 36 in accordance with this embodiment of the present invention. In this embodiment the simulation is arranged to record only simulated equipment use and utility availability. It will be appreciated that other data such as quantities of product made or quantities of raw materials consumed could be monitored in addition to the equipment use and utility availability monitored in this embodiment.

In accordance with the present embodiment, the output records each comprise a time field 140 containing data indicating the relative time of the output data relative to the initiation of the model; an equipment in use field 142 comprising a list of equipment identification numbers 50 of equipment having status flags 54 indicating that the equipment is in use at the time indicated within the time field 140 and a list of utility levels comprising the values of the instantaneous quantities of utilities, wastes and products 102 of each of the utility records within the utilities data 32 for the user's activities at the time indicated in the time field. Thus in this way the output data records enables the use and level of utilities for each of the utilities and equipment within a model to be stored for each step throughout the running of a simulation.

The input of data identifying the items of equipment, utilities and batches of product to be simulated prior to simulation of a process will now be described.

In this embodiment equipment utilized in a process is modelled in terms of processes which an item of equipment is used for and fundamental physical parameters. Equipment records 31 are generated either by selecting data from a library of predefined records for types of equipment stored on a disk 10 or directly input via the keyboard 5 and mouse 7. In order to facilitate input of equipment data, in this embodiment of the present invention the input module 15 is arranged to generate a graphical interface for inputting data in a similar manner to that provided by the Extend TM Software provided by ImagineThat Inc.

Figure 12:
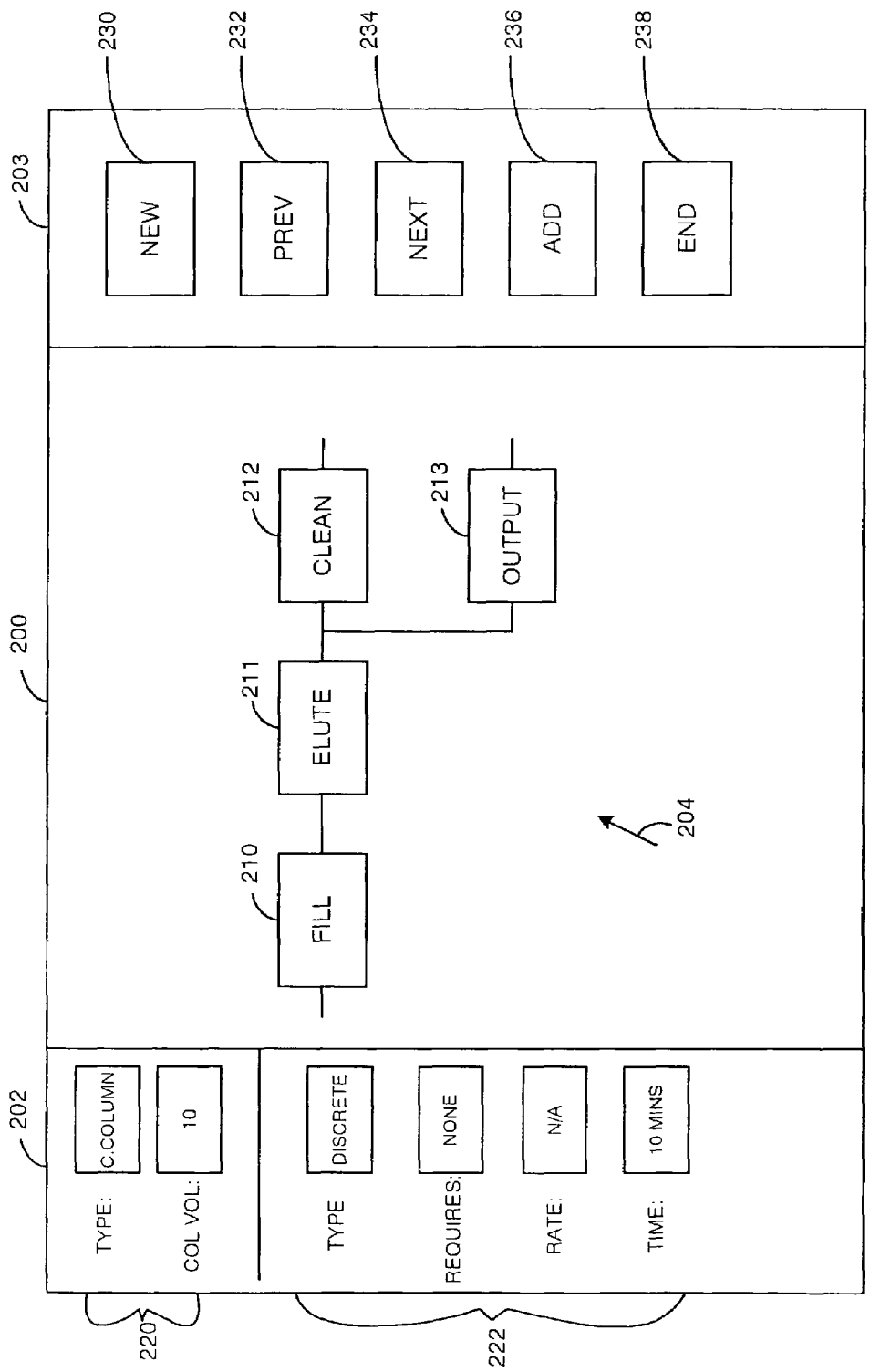
FIG. 12 is an exemplary graphical interface for inputting equipment data.

FIG. 12 is an exemplary graphical interface for inputting equipment data. In this example the interface comprises a main input screen 200, to the left of the main input screen 200 is a data entry screen 202 for inputting data for storage as equipment data nd to the right is a control screen 203. Also displayed is a pointer 204 which is controlled using the mouse 7.

In this embodiment the main input screen 200 is arranged to display a block diagram of processes undertaken by an item of equipment to be modelled. In this example the equipment to be modelled comprises a chromatography column which is initially filled 210, then eluted 211 and then cleaned 212. The elution 211 also results in output 213.

The data entry screen 202 comprises a parameter entry section 220 and a process edit section 222. The control screen 203 comprises a new button 230, a previous button 232, and a next button 234 used for navigations between a data entry for different items of equipment, an add button 236 and an end button 238.

In use, initially a user selects utilizing the mouse 7 and the pointer the new button 230 which causes a new equipment record to be generated in which the main input screen is blank. Selecting the add button 236 causes a new block to appear within the main input screen 200. Blocks displayed in the main input screen 200 can then be selected using the pointer. If a block is selected the block may be edited to enter a name for example fill, elute etc corresponding to the process the block represents. If two blocks are selected a line is shown connecting the blocks to indicate which processes follows one another.

Selecting a block also cause the process edit section 222 of the data entry screen 202 to display type, requirement, rate and time data associated with a block to be displayed. This data can then be edited by selecting the portion of the process edit section 222 to be changed and inputting new data via the keyboard 5. Thus in this way by entering data each process is associated with data for storage as a process record 60-64. In a similar way equipment type data 52 and physical parameter data 55 can be entered using the parameter entry section 220 for the equipment being modelled. Equipment data for other items of equipment can be entered by selecting the next or previous buttons 232. When parameters for all items of equipment have been entered a user can select the end button 238 which causes all of the entered data to be stored in the form of equipment records.

The data for batch data records and utilities records are then entered using other interfaces in a similar manner which will not be described in detail here. Thus in this way the processing of specific equipment for a defined set of batches is input.

After equipment records 31, utilities records 32 and batch data 34 have been input using the input module 15 of the modelling program within the memory 11 a simulation of an industrial process may be created using the modelling module 17 utilizing the input data. The processing of modelling module 17 in accordance with an embodiment of the present invention will now be described with reference to FIGS. 13, 14, 15A and 15B.

In accordance with this embodiment of the present invention, the modelling module 17 repeatedly utilises and updates the modelling data 19 in order to simulate the processing of an industrial process. As a result of the modification of modelling data 19 by the modelling module 17 output data indicative of the use of equipment within the simulation and instantaneous levels of available utilities modelled within the simulation are generated.

Figure 13:
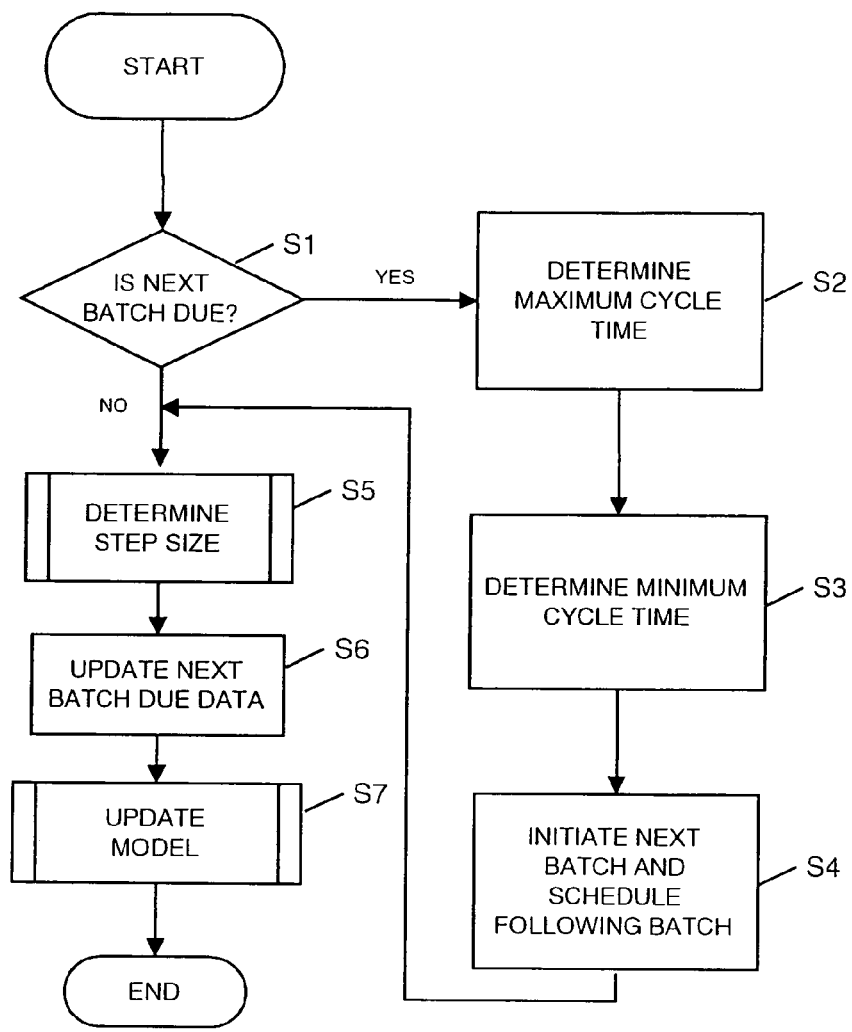
FIG. 13 is a flow diagram of the processing of a modelling module in accordance with a first embodiment of the present invention.

FIG. 13 is a flow diagram illustrating the processing of the modelling module 17 to generate output data for a step within a simulated process. Initially (S1) the modelling module 17 determines whether the next batch due data 119 in the batch data 34 is equal to zero indicating that a new batch is to be initiated. If this is the case the modelling module 17 then (S2) determines the greatest previous cycle time 68 currently associated with an equipment record 31. This maximum cycle time is then stored in the memory 11.

The modelling module 17 then (S3) determines minimum cycle times for processing the next batch by each of the items of equipment which are to be simulated. This is achieved by the modelling module 17 calculating for each item of equipment the sum of times associated with completion conditions 74 for each of the discreet process records 60 and continuous process records 62 for an item of equipment where the completion conditions 74 are either fixed or dependent upon batch parameters 136 for the batch record having a batch identification number 130 corresponding to the next batch pointer 117. Thus in this way a minimum cycle time for each item of equipment for processing the batch is determined in which the processing of a batch is not delayed in any way by external constraints such as the availability of utilities.

The modelling module 17 then causes the equipment identification data 132 associated with the batch record having a batch number 130 corresponding to the next batch pointer 117 to be set equal to the equipment identification number 50 for initially processing that batch and sets the active flag 70 for the first process of the processes associated with the equipment record having the equipment identification number 50 for the first item of equipment to process the batch to indicate that the process is now active. The modelling module 17 then updates the next batch pointer 117 to be equal to the batch number 130 of the next batch record of the plurality of batch records 115 and sets as the next batch due value 119 a value corresponding to the greater of either the maximum cycle time of the current model or the determined minimum cycle time for the initiated batch throughout which ever is greater.

By calculating an initial next batch being due value equal to the greater of either the current maximum cycle times for equipment within the model or the minimum cycle time necessary to process the latest batch but a means is provided to ensure that the processing of the newly initiated batch is completed by simulated equipment within the model before the next batch is started throughout the simulation. The calculated scheduling of batches in this manner thus ensures that at no point within the simulation, two batches initiated at different times are combined within the same item of equipment and hence enables the modelling of industrial microbiological processes to be undertaken.

After the modelling module 17 has initiated if a new batch is due or if the modelling module 17 determines that no new batch is due, the modelling module 17 then determines (S5) a suitable timing increment or step size for generating output data as will now be described with reference to FIG. 14.

Figure 14:
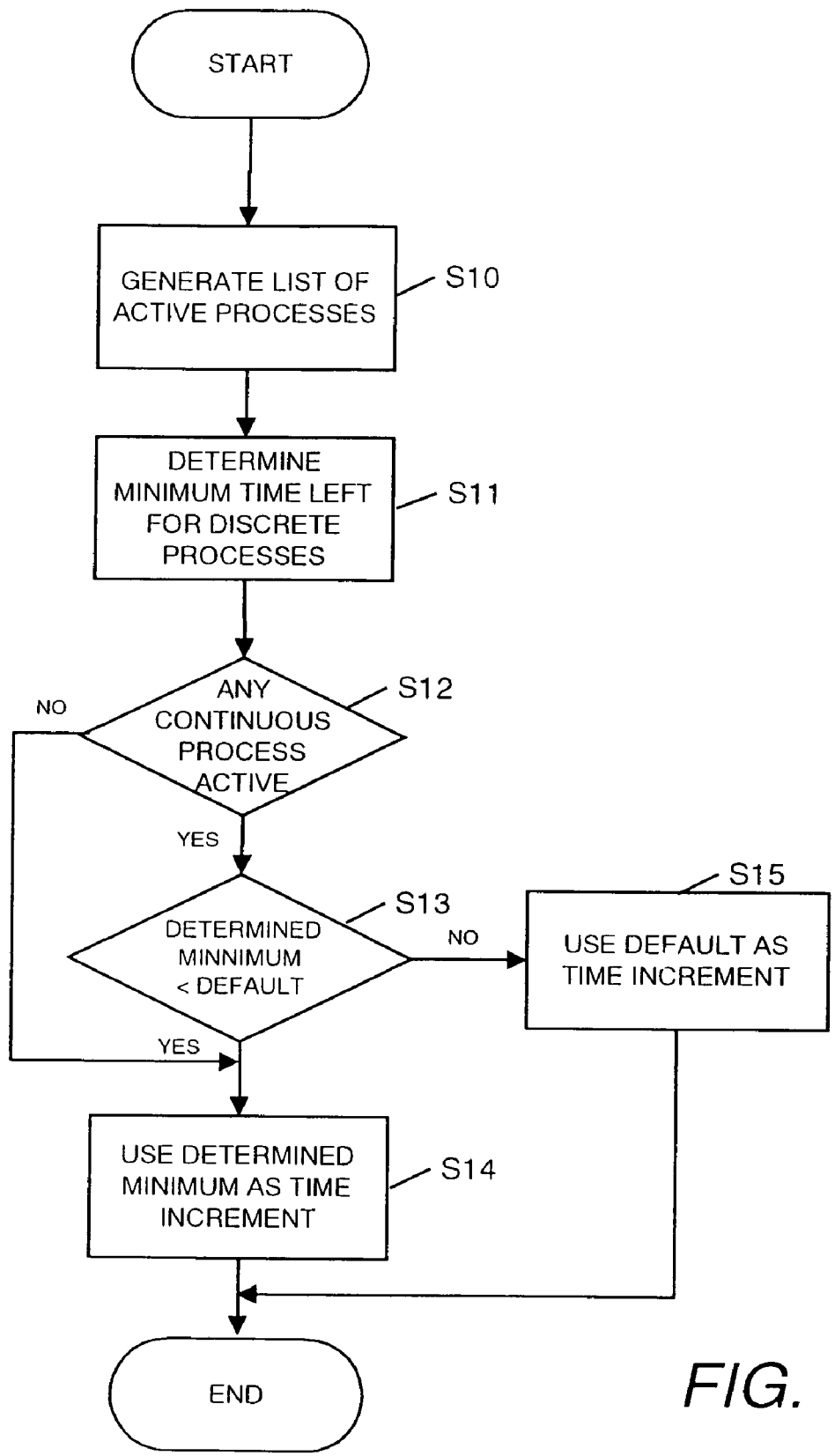
FIG. 14 is a flow diagram of the processing of a modelling module determining a time increment.

FIG. 14 is a flow diagram of the processing of the modelling module 17 determining a time period for use in updating the output data for a simulated process. Initially the modelling module 17 generates (S10) a list of active processes being list of equipment identification numbers 50 and process identification numbers 69 of discreet and continuous process records 60, 62 having data 70 indicating that those processes are currently active. The modelling module 17 then appends to the list data indicative of the utility records 32 having associated generator status 106 indicating that utility is currently being generated.

The modelling module 17 then determines a minimum time increment required to fulfil the completion conditions for or each of the active discreet processes in the generated list. In this embodiment this is achieved by the modelling module 17 initially selecting as a suitable time increment a time increment corresponding to the next batch due time 119 for the bath data 34. The modelling module 17 then determines for the first of the discreet processes in the list of generated list of active processes the difference between the time active data 72 for the corresponding process record and the time required to fulfil the completion condition 74 for that record. If this is less than the next batch due time 119 this time difference is then stored as the current minimum time increment for the model. The modelling module 17 then proceeds to determine a calculated time difference for the next active process on the list of processes and substitute this time difference if it is shorter than the currently stored minimum time difference. This is repeated for each of the active processes on the list and in this way the minimum time difference to complete an active discrete process or the next batch initiation is determined.

The modelling module 17 then (S12) determines whether within the list of active processes generated any records correspond to continuous process records 62. If no continuous records are within the list, the stored minimum time difference is then (S14) selected as the next time increment.

If at least one continuous process is active, the modelling module 17 then (S13) determines whether the stored minimum time increment stored in memory 11 is smaller than the default time increment for modelling continuous processes. If this is determined to be the case the modelling module 17 then (S14) selects the determined minimum time difference stored in memory 11 as a time increment for updating the output data 36. If the default time difference is determined to be smaller than the stored minimum time difference, the modelling module 17 then (S15) selects the default time difference as a time increment.

Returning to FIG. 13, after a suitable time increment has been selected (S5) the modelling module 17 then (S6) updates the next batch due data 119 to account for the selected time increment. The modelling module 17 then updates (S7) the modelling data 19 within the memory 11 utilising the selected time increment as will now be described in detail with reference to FIGS. 15A, B and C.

Figure 15A:
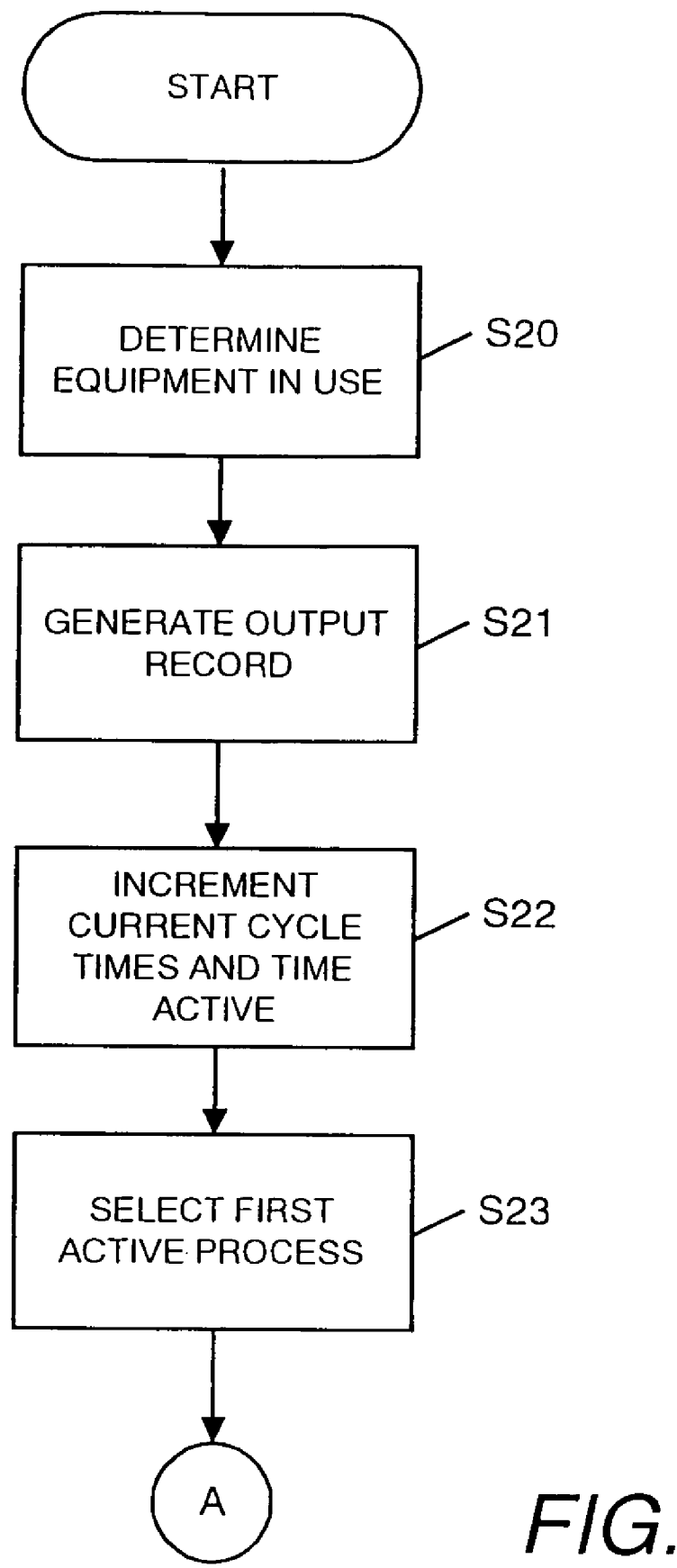
FIGS. 15A, 15B and 15C are a flow diagram of the processing of a modelling module updating model data.
Figure 15B:
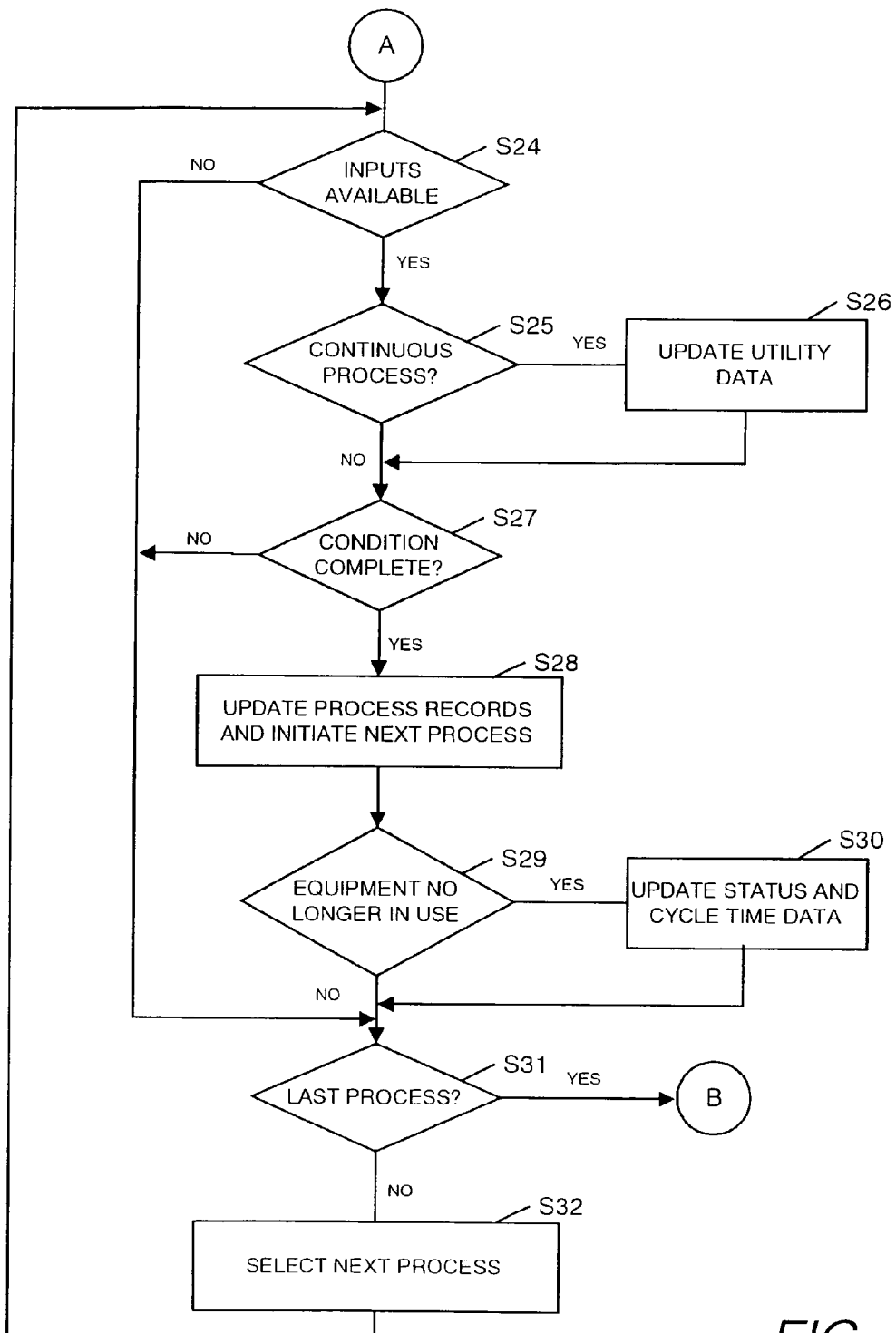
Figure 15C:
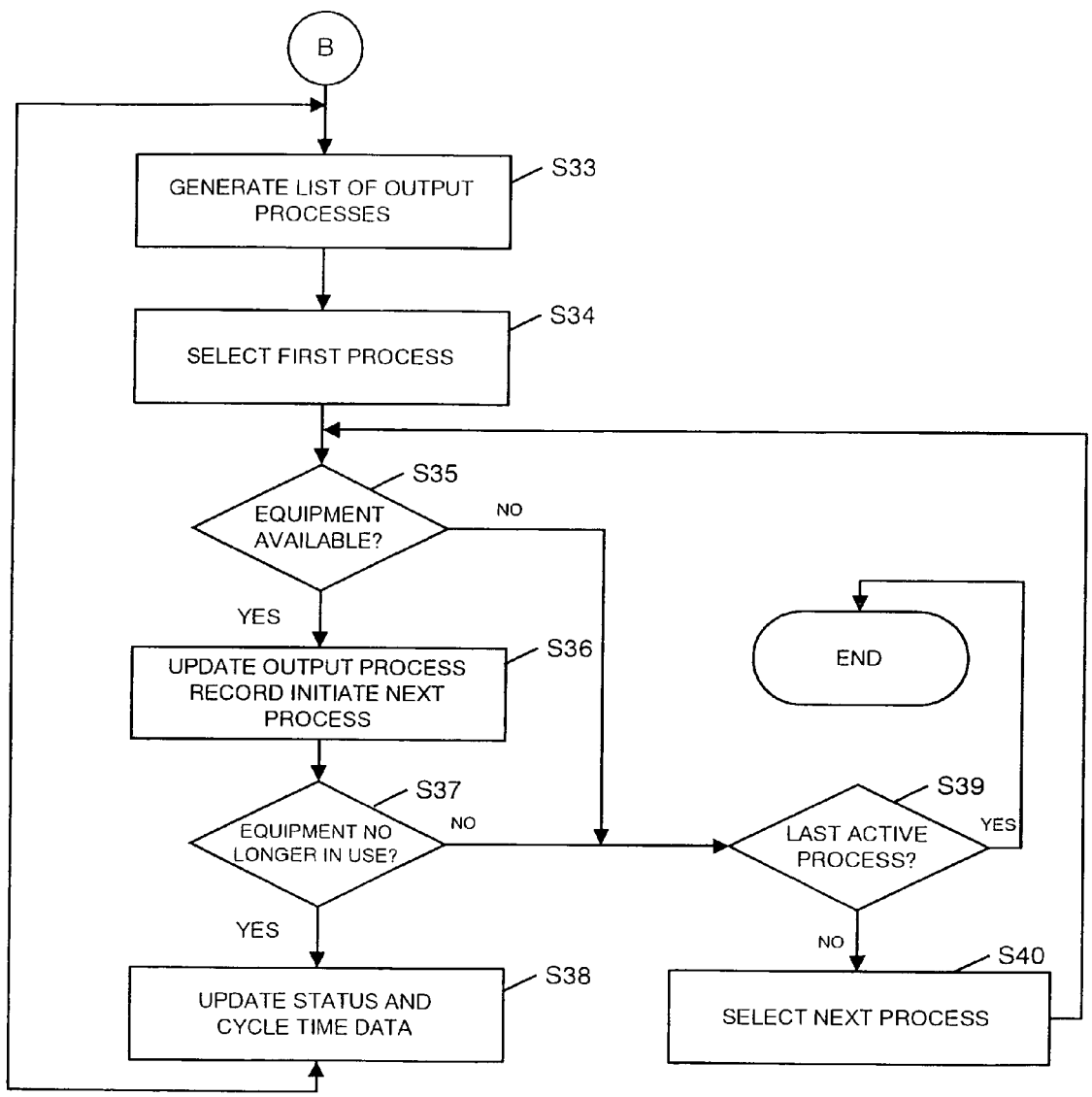

FIGS. 15A, 15B and 15C are a flow diagram of the processing of the modelling module 17 for updating modelling data 19 after a suitable time increment has been determined.

Initially (S20) the modelling module 17 determines which items of equipment are currently in use. In this embodiment this is achieved by the modelling module 17 generating a list of equipment identification numbers 50 corresponding to equipment records in which at least one process corresponding to either a discrete process record 60 or a continuous process record 62 has a active status 70 indicating that the item of equipment is undertaking some process.

Thus for example in this embodiment for a particular process for a set of batches in which two fermentation vessels, two storage vessels, a centrifuge, a chromatography column where water for injection is measured are utilized the following might be an extract from a set of output records.

| TIME | EQUIPMENT IN USE | WFI LEVEL |
|------|------------------|-----------|
| 1000 | Fermentation Vessel 1, Fermentation Vessel 2 Chromatography column | Water = 100 |
| 1010 | Fermentation Vessel 1, Centrifuge Chromatography column | Water = 100 |
| 1011 | Fermentation Vessel 1, Centrifuge Chromatography column | Water = 99 |
| 1012 | Fermentation Vessel 1 Centrifuge Chromatography column | Water = 98 |
| 1013 | Fermentation Vessel 1 Centrifuge Chromatography column | Water = 97 |
| 1033 | Fermentation Vessel 1 Centrifuge Chromatography column | Water = 97 |

In this way output data which can subsequently be displayed in the form of a GANT chart or a graph of available quantity of modelled utility is generated.

It will of course be appreciated that other data could be stored for example data indicative of instantaneous demand for a utility within a model. Alternatively further data for example data indicative of the simulated processes being undertaken by an item of equipment, or initiation and progress of individual batches could also be stored.

The modelling module 17 then (S21) generates a new output data record 36 comprising time data 140 corresponding to the time data 140 of the last output record generated incremented by the selected time increment; equipment in use data 142 comprising the generated list of equipment in use, and utility quantity data 144 comprising a list of utility type 100 and current utility quantity 102 for each of the utility records 32 stored in memory.

The modelling module 17 then (S22) causes the current cycle time data 66 associated with each equipment record having equipment identification data 50 corresponding to the list of items of equipment in use to be incremented by the value corresponding to the selected time increment.

Thus, in this way, the levels of model utilities and the times at which modelled items equipment are in use are stored as output data and the current cycle time data 66 for each equipment record is updated to indicate the additional time in use of each item of equipment.

The modelling module 17 then proceeds to utilise the list of active processes previously generated (S10) and stored in memory to update the data within the discrete process record 60 and continuous process record 62 and utility records 36 to simulate the action occurring in the model over the selected time period, as will now be described.

The modelling module 17 initially (S23) selects the first of the active processes within the list of active processes stored in memory 11. The modelling module 17 then (S19) determines whether the inputs required corresponding to the input data 76 for the process record are currently available, for example, where the quantity of a utility necessary for a process is above a certain threshold. If this is determined not to be the case the process is not simulated the modelling module proceeds to determine (S31) whether the process currently under consideration is the final active process.

If the modelling module 17 determines that the necessary inputs are available for a process, the modelling module 17 then determines (S25) whether the current process being updated comprises a continuous process. If this is the case, the modelling module 17 then proceeds (S26) to update the utility quantity 102 corresponding to the required input 76 for the process by decrementing the current quantity 102 for the utility required indicated by the input data 76 by an amount calculated by multiplying the selected time increment by the rate determination data 82 for that utility. Thus, in this way, whenever a continuous process utilising a utility is modelled, the demand for utilities are also modelled in a way in which an approximation of instantaneous demand for utility can be determined.

After updating any utility records (S26) if necessary the modelling module 17 then (S27) determines whether the completion condition 74 for the process currently under consideration has been fulfilled.

Thus, for example, where the completion condition 74 comprises an amount of time necessary to complete a process, the modelling module 17 compares the time active data 72 for the process with the completion condition 74 to determine whether the process is complete. Alternatively, where a completion condition 74 comprises the completion of another process or the availability of some item of equipment or equipment having a specified equipment type, the determination (S22) of whether the completion condition 74 is fulfilled would comprise determinations of status data 54 of appropriate equipment records or active data 70 of process records.

If the modelling module 17 determines (S27) that the completion condition has not yet been fulfilled, the modelling module 17 then proceeds to determine whether the process currently under consideration is the last process (S31) as will be described later. If the modelling model 17 determines (S27) that the completion condition 74 for the process currently under consideration has been fulfilled, the modelling module 17 then (S28) causes the active flag 70 and time active 72 for the current process to be reset to indicate that the process is no longer taking place and causes the active flag 70 on the record corresponding to the next action 80 within the current process to be set to indicate that process is to be initiated.

Where the next action 80 of a process which is determined to be complete corresponds a null value, the process which is currently being simulated comprises the final process which takes place within an item of equipment. Where such an active process is completed, the modelling module 17 then (S29) determines whether any other process is occurring within the item of equipment which is being modelled. If this is not the case, the completion of the current process is indicative of the equipment no longer being in use. The modelling module 17 then proceeds to change the status data 54 for the item of equipment which the process currently under consideration forms a part to indicate that the equipment is no longer in use and sets the previous cycle time 68 for that item of equipment equal to the current cycle time 66 and then resets that current cycle time to zero.

Thus in this way whenever it is determined that no processes are occurring within a simulation of an item of equipment, the status data associated with that item of equipment and the current cycle time data 66 are reset to indicate that the equipment is inactive whilst the previous cycle time data 68 is made to reflect the time taken from the initiation of activity within the equipment to its completion for the last time that the equipment corresponding to the equipment was in use.

After the status and cycle time data of an item of equipment which has ceased to be in use has been amended (S30) or if the process under consideration is either determined not to be complete (S27) or the inputs necessary for the process (S24) are determined not to be available, the modelling module 17 then (S31) determined whether the current process under consideration comprises the final process in the list of processes in memory. If this is not the case, the modelling module 17 then selects (S32) the next process within the list of actual processes in memory and then proceeds to determine whether the inputs are available to continue the nearly selected process (S24).

Thus in this way the simulation of processes utilising equipment is simulated for the predetermined time period for each of the active processes within the simulation and equipment and utilities data is amended to reflect the actions taking place as a result of the process steps. At the same time, the cycle times for each item of the equipment are monitored so that the maximum cycle time for equipment within a processing line can be determined and the scheduling of new batches through the simulation selected so as to ensure that queues do not develop within the simulation.

If the process currently under consideration is determined to be the last in the list of active processes stored in memory 11 the modelling module 17 then (S33) generates a list of output records having an active flag 90 indicating that the processes of the output process records 64 are currently awaiting to be completed. The modelling module 17 then (S34) selects the first of the records on the generated list and then (S35) determines whether the status of equipment within the model is such that the output process may be completed.

In this embodiment this is achieved by the modelling module 17 initially identifying the batch record 115 having the equipment identification number 132 corresponding to the equipment identification number 50 of the equipment record containing the output process record 64 currently under consideration. The modelling module 17 then determines whether the routing data 134 of the selected batch record 115 specifies a particular item of equipment to which the batch under consideration is to be routed. If this is the case then the modelling module 17 then determines whether the status data 54 of the identified equipment record 31 to which the batch is to be directed is currently inactive. Alternatively if the batch record 115 does not specify a particular item of equipment to which a batch is to be routed then the modelling module 17 utilises the next equipment type data 92 for the output process record 64 currently under consideration to determine which items of equipment the current batch may be routed to and then determines whether the status data 54 of equipment records 31 corresponding to the requirements of the next equipment type data 92 indicates that any item of equipment fulfilling the requirements of the next equipment type data 92 is currently inactive.

If the modelling module 17 determines that the current status data 54 for an equipment record 31 corresponding to an item of equipment to which a batch may be routed indicates that the item of equipment is inactive the modelling module 17 then (S36) updates the output process record 64 currently under consideration by amending the active flag 90 to indicate that the process is no longer continuing and then initiates the next process in the available equipment by altering the status data 54 of the equipment record 31 corresponding to the next item of equipment being used to indicate that the equipment is now active and also causing the active flag 70 of the first process of the process of records 60, 62 for that equipment record 31 to be set to indicate that the first process is about to be undertaken.

The modelling module 17 then (S37) determines whether the equipment record 31 containing the output process 64 currently under consideration which has just be completed is now no longer undertaking any process. This is achieved by the modelling module 17 determining whether any of the discrete process records 60 or continuous process records 62 for the equipment record 31 containing the current output process record 64 have active flags 70 indicating that the process is within the equipment are currently active. If no discrete 60 or continuous 62 processes are active the completion of the output process under consideration would have resulted in the equipment used for the output process to now be available for use once again. The modelling module 17 then (S38) causes the status data 54 for the equipment record 31 containing the output process record 64 currently under consideration to be updated to indicate that the equipment is now no longer in use and sets the previous cycle time data 68 to be equal to the current cycle time data 66 before resetting the current cycle time data 66 to zero. Since the new availability of a further item of equipment can effect the possible completion of other output processes, in accordance with this embodiment of the present invention the modelling module 17 then generates a new list of output processes (S33) so that the possible fulfilment of those all output processes may be considered once again.

If it is determined (S35) that the equipment available necessary to complete the output process currently under consideration is not available or the completion of an output process does not result in an item of equipment becoming free for use (S37), the modelling module 17 proceeds to determine (S39) whether the output process currently under consideration is the last active process in the generated list of output processes.

If this is not the case, the modelling module 17 proceeds (S40) to select the next output process record for consideration as to whether the equipment for completing the next process is available for use (S35). If the current output process is the final process in the list of output processes generated by the modelling module 17 the processing of the modelling module for the step of the model currently being simulated then ends.

After the simulation has been completed the computer 1 will have stored in memory 11 output data 140-144 which can be output either as a graph or as a table and displayed on the display 3 or printed out in hard copy from utilizing the printer 8. By varying the batch and utilities records 32, records 120, equipment records 31 utilizing the input module 15, a number of different simulations can be performed to identify how the variation of parameters effects the simulation and resulting output data. Actual equipment for performing a process can the be selected and the scheduling of batches performed in accordance to the equipment 31 and utility 32 records and batch records 120 respectively with the equipment and schedules being such as to correspond to a simulation whose use of equipment is determined to represent an efficient process.

SECOND EMBODIMENT

A second embodiment of the present invention will now be described. In the first embodiment a system is described which is suitable for modelling a continuous production process. Many production processes, however, involve shift work. Where, for example, biological material is being manufactured in separate shifts, it is necessary to ensure that processing between hold points is achievable prior to the end of a shift. This embodiment of the present invention is identical to the first embodiment except the modelling module 17 is modified to enable the additional constraint that processing between hold points must be completed within certain shifts is simulated.

Figure 16:
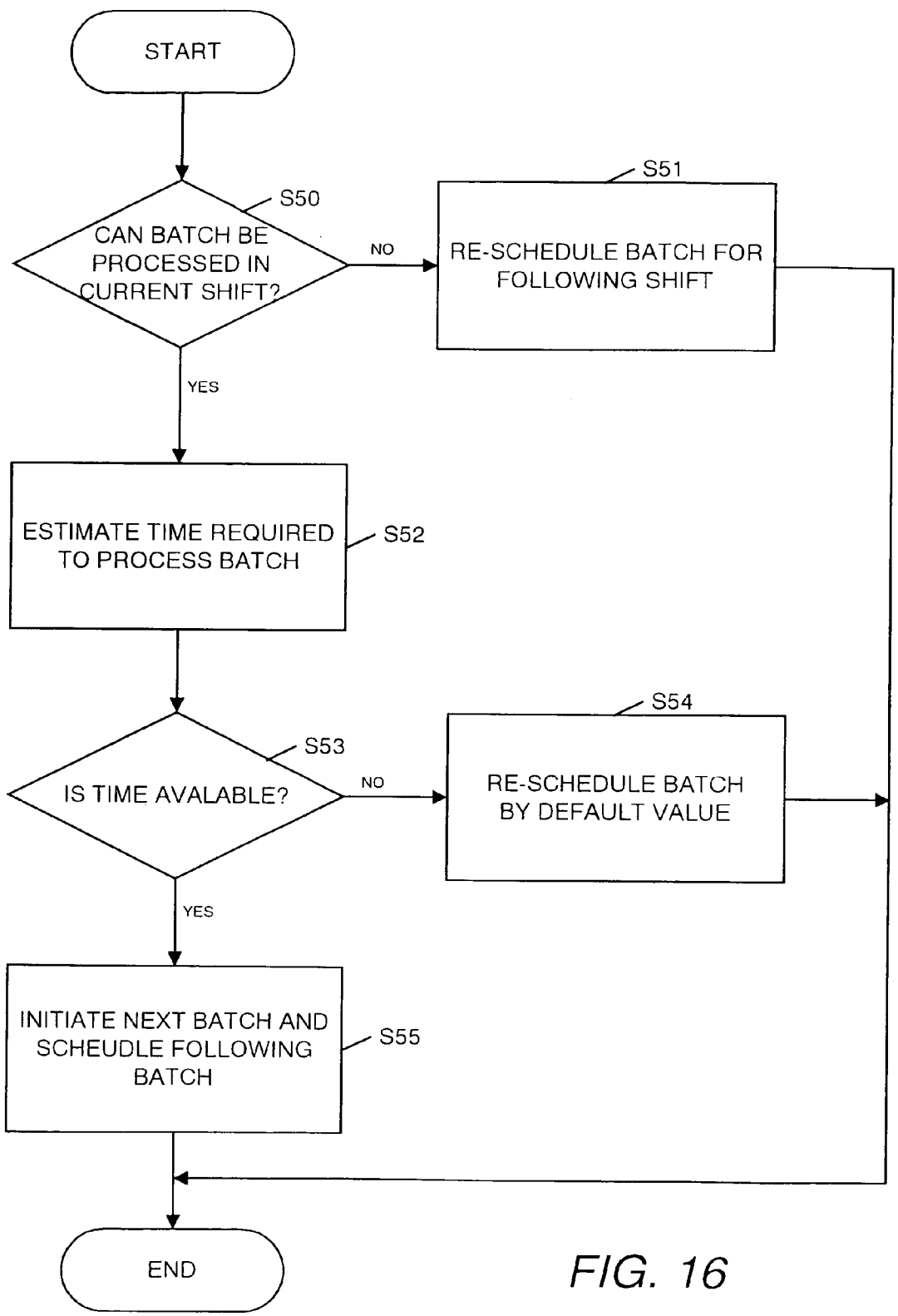
FIG. 16 is a flow diagram of the processing of a modelling module in accordance with a second embodiment of the present invention.

Specifically, the processing of the modified modelling module 17 is identical to the processing described in the previous embodiment except the modified modelling module 17 additionally stores a simulated current time so that the time remaining before the end of a shift can be determined, and the processing of the modelling module 17 after it has been determined that a new batch is due to be initiated is modified as will now be described with reference to FIG. 16.

Initially (S50), after it has been determined that a new batch is due to be initiated, in this embodiment the modelling module 17 first determines whether it is possible to complete the processing of the new batch within the time remaining in a current shift. In this embodiment this is achieved by the modelling module 17 first determining the time remaining within the shift utilizing the current simulated time and pre-stored data identifying when a shift ends. This time remaining is then compared with the minimum time within which the next batch being initiated could possibly be processed. This minimum time itself can be determined from the data defining the processes to be undertaken to process a batch assuming that only the processes associated with a completion condition 74 identifying a specific time elapse cause any delay in the processing of the batch.

After the modelling module 17 has determined the minimum possible processing time for processing a batch, it is determined whether this minimum time is greater than the time remaining in the current shift. If this is the case, the modelling module 17 then automatically re-schedules initiation of the batch (S51) by setting the initiation of the next batch to be due at the beginning of the next shift. The processing of the modelling module then continues with determining a new appropriate step size (S5) has as previously been described in relation to the first embodiment with reference to FIG. 13.

If, the modelling module 17 determines that processing of a new batch could possibly be completed within the time available within the remaining time for a shift, the modelling module 17 then (S52) proceeds to estimate the likely time required to actually process the batch. In this embodiment this is achieved by the modelling module 17 determining the sum for each item of equipment 50 which is required to process the batch which is about to be initiated the greater of the previous cycle times 68 associated with each item of equipment or the estimated minimum time for the item of equipment to process the new batch.

The modelling module 17 (S53) then determines whether this estimated processing time indicates that the completion of the batch will occur before the end of the current shift. If the modelling module 17 determines that processing of the batch to be initiated will not be completed within the time remaining in the current shift the modelling module 17 then (S54) re-sets the next batch due data 124 for the current batch to a default value indicating that reconsideration of initiating the batch should occur after that default time period has been simulated. The processing of the modelling module 17 then continues to determine an appropriate step size (S5) as has previously been described in relation to the first embodiment.

If, however, the modelling module 17 determines that the batch to be initiated is likely to be processed within the current shift, the modelling module 17 then (S55) proceeds to initiate the current batch and schedules the following batch (S55) as has been previously described in the previous embodiment in relation to FIG. 13 (S2-S4) before proceeding to determine an appropriate step size (S5) for continuing the simulation.

By determining whether the processing of a batch is likely to be completed before the end of a shift before initiating the processing of a batch, a means is provided to simulate the running down of production at the end of a work day. The re-scheduling of batches which cannot possibly be processed within the time available ensures that once it is established that the processing of a batch is impossible no further reconsideration of initiating the batch occurs until the following shift. In contrast, where it appears on the basis of current cycle times a batch is merely unlikely to be processed within the available time, the rescheduling of a batch by a default delay (S54) enables the status of a production line to be re-checked at regular intervals in case current bottle necks in the production process are overcome and processing can be initiated.

In the above embodiment the estimated time required to process a new batch is determined purely by calculating the sum of previous cycle times 68 or minimum processing times for items of equipment which are to be utilized to simulate the processing of the batch. Other more sophisticated algorithms for estimating a likely processing time could however be utilized. For example, the time for processing a batch could be determined by summing for each item of equipment to be utilized to process the batch the greater of the current cycle times 66 or the previous cycle time 68 associated with items of equipment utilized to process the batch.

Alternatively, each time the particular process utilizing an item of equipment is simulated, the actual processing time could be stored. Where it was imperative that a particular type of batch had to be processed within a particular shift, the estimated time required for processing a batch of that type could then be determined by summing the greatest stored cycle times for each item of equipment utilized to process a batch of that type.

Alternatively, where some flexibility in shift time is available, the distribution of cycle times for processing a particular type of batch could be determined and a value corresponding to an estimated time required selected on the basis that a default percentage of processing would normally occur within the selected time period. Thus for example, where in 90% of cases processing a particular type of batch are determined to take place within the specified time period, that the time period might be utilized as an estimate of the time required for processing a batch of that type.

FURTHER AMENDMENTS AND MODIFICATIONS

Although in the first embodiment a system is described in which data is entered utilizing a graphical interface, it will be appreciated that as the equipment records 31, utility records 32 and batch records 120 comprise data associated within a record any suitable form of input interface could be utilized to generate records.

In particular, by defining equipment in terms of a number of physical parameters 55 and a number of processes 60, 62, 64 any type of equipment can be pre-defined. The passage of individual batches between different items of equipment would then be simulated by entering data for routing data 134, batch parameters 136 for batches and data for the processes 60, 62, 64. Thus by directly entering the definition for processing in terms of processing undertaken by items of equipment and detailing exactly what is to be processed by entering routing data and batch parameters 134,136 great flexibility in defining a production system to be simulated can be achieved. In particular, by directly entering information such as the routing data 134 where different products as identified by the batch parameters 136 are processed in different ways using the same equipment, direct entry of data enables multiple processes using the same items of equipment to be designed more easily than can be achieved using a graphical interface.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When a program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

The invention claimed is:

1. A method of simulating an industrial process comprising the steps of:

storing model data indicative of a plurality of processes involving a number of items of equipment to be used in an industrial process to be simulated;

initiating a first simulated batch for simulated processing;

generating scheduling data for scheduling the initiation of simulated batches after the initiation of said first simulated batch by, when simulated processing of a latest initiated batch is initiated:

identifying items of equipment liable to be involved in simulated processing of a next batch to be initiated after said latest initiated batch;

utilizing said stored model data to determine for each item of said identified items of equipment a minimum possible simulated processing time required for simulated processing of said latest initiated batch;

determining for said identified items of equipment which are currently in use for processing batches currently being processed, the greatest time of use of previously simulated in processing batches using said items of equipment; and generating scheduling data for the next batch to be initiated after the latest initiated batch to cause the time between the initiation of said latest initiated batch and said next batch within said simulation to be equal to the greater of the maximum of said minimum possible simulated processing times for said items of equipment involved in simulated processing of said next batch and said greatest time of use for said identified items of equipment currently in use; and generating output data indicative of a simulation of an industrial process utilizing said stored model data and said generated scheduling data.

2. A method in accordance with claim 1, wherein said determination of the greatest time of use of an item of equipment utilized in processing comprises the steps of:

storing in association with each item of equipment to be simulated data indicative of the time of use of said item of equipment for a batch previously processed by said item of equipment; and determining as the greatest time of use the greatest time of use of said stored times of use.

3. A method in accordance with claim 1, wherein said determining of the greatest time of use of an item of equipment further comprises for each of the said items of equipment the steps of:

determining whether an item of equipment is in use; and if an item of equipment is in use determining the total time the item of equipment has been in use for a current batch; and if an item of equipment is no longer in use storing said total time in use as said time in use for said equipment.

4. A method in accordance with claim 3, wherein each of said items of equipment is associated with a number of processes wherein said determination of whether an item of equipment is in use comprises determining whether any of said processes associated with said item of equipment is currently being simulated.

5. A method in accordance with claim 1, wherein said utilizing said stored model data to determine a minimum possible simulated processing time for each of said identified items of equipment comprises storing, for each batch to be initiated, data indicative of the greatest of said minimum possible processing times; and wherein said generating scheduling data for the next batch to be initiated after the latest initiated batch comprises utilizing said data indicative of the greatest of said minimum possible processing times to generate said scheduling data.

6. A method in accordance with claim 1, wherein said utilizing said stored model data to determine a minimum possible simulated processing time for each of said identified items of equipment comprises:

associating, with a batch to be initiated, data to be indicative of the items of equipment to be utilized in simulated processing of said batch; and determining said minimum possible simulated processing time for each item of equipment associated with said batch to be initiated.

7. A method in accordance with claim 6, wherein each of the said items of equipment is associated with a number of processes, each of said processes being associated with data identifying one or more completion conditions for that process, and one or more of said processes being associated with data identifying completion conditions including one or more lapses of one or more specified time periods in the simulation of a process, wherein said utilizing said stored model data to determine a minimum possible simulated processing time for each of said identified items of equipment comprises determining a sum of said one or more specified time periods included in the one or more completion conditions associated with said one or more processes of said items of equipment.

8. A method in accordance with claim 7, wherein said storing model data further comprises associating, with at least some of said number of processes involving said items of equipment, rate data identifying the respective associated process as utilizing a utility at a rate; and wherein said generating output data comprises, for each step in a simulation, the steps of:

determining whether any process of said plurality of processes to be simulated is associated with rate data;

determining the minimum time increment step size required to complete any of the processes currently being simulated; and selecting as a time increment step size for generating output data a default time increment step size, if at least one process associated with rate data is to be simulated and said default time increment step size is smaller than said determined minimum time increment step size, and selecting as said time increment step size said determined minimum time increment step size if no process to be simulated is associated with rate data or said default time increment step size is greater than said determined minimum time increment step size.

9. A method of simulating an industrial process comprising the steps of:

storing model data indicative of a plurality of processes involving a number of items of equipment to be used in an industrial process to be simulated;

determining a time increment step size to be used with said model data; and generating output data indicative of a step within a simulation of an industrial process utilizing said stored model data and said determined time increment step size, wherein said storing model data further comprises storing rate data in relation to at least some of said processes, and wherein said determining a time increment step size comprises, for each step in a simulations, the steps of:

determining whether any process of said plurality of processes to be simulated is associated with rate data identifying the respective associated process as utilizing a utility at a rate;

determining a minimum time increment step size required to complete any of the processes currently being simulated; and selecting, as a time increment step size for generating output data, a default time increment step size, if at least one process associated with rate data is to be simulated and said default time increment step size is smaller than said determined minimum time increment step size, and selecting as said time increment step size said determined minimum time increment step size if no process to be simulated is associated with rate data or said default time increment step size is greater than said determined minimum time increment step size.

10. A method in accordance with claim 9, wherein said storing model data further comprises associating utility type data with said at least some of said plurality of processes, and wherein said generating output data comprises generating, for steps in a simulation, output data associated with items of utility type data utilizing rate data associated with a process being simulated and said determined time increment step size.

11. A method in accordance with claim 10, wherein said generating output data comprises determining, for steps in a simulation, output data representative of an instantaneous demand for a utility corresponding to an item of utility type data utilizing determined sums of rate data associated with said utility type data for processes being simulated.

12. A method in accordance with claim 10, wherein said generating output data for steps within a simulation comprises:
    storing, in association with items of utility data, quantity data indicative of a current quantity of a utility within a simulation, wherein said quantity data is determined utilizing rate data associated with processes being simulated and said determined time increment step size.

13. A method in accordance with claim 12, wherein said quantity data for a step in a simulation is determined by incrementing or decrementing quantity data associated with utility type data for the previous step in a simulation by the product of said determined time increment step size and the sum of rate data associated with said utility data and processes being simulated.

14. A method in accordance with claim 13,
    wherein said storing model data further comprises storing, in association with said items of utility type data, minimum quantity data and generation rate data,
    wherein said quantity data of for a step in a simulation is determined by incrementing or decrementing quantity data for the previous step in a simulation by the product of said generation rate data and said determined time increment step size if said quantity data is less than said minimum quantity data associated with said utility type.

15. A method in accordance with claim 14, wherein storing model data further comprises storing maximum quantity data in association with said items of utility type data,
    wherein said quantity data for a step in a simulation is determined by incrementing or decrementing quantity data for the previous step in a simulation by the product of said generation rate data and said determined time increment step size only when said quantity data associated with said utility type does not exceed said maximum quantity data associated with said utility type.

16. A method in accordance with claim 10, wherein said generated output data associated with utility type data comprises data indicative of the simulated availability of utilities or waste processing capacity.

17. A method in accordance with claim 12,
    wherein said storing model data comprises storing, in association with at least some of said plurality of processes, data indicative of one or more continuation conditions, and
    wherein said generating output data comprises, for each step in a simulation, the steps of:
        determining which of said plurality of processes are to be simulated in said step of said simulation;
        determining for processes to be simulated associated with data indicative of one or more continuation conditions whether output data generated for the previous step in said simulation fulfills the one or more continuation conditions defined by said data; and
        if at least one continuation condition for a process being simulated is not fulfilled simulating a delay in the continued processing of said process.

18. A method of simulating an industrial process comprising the steps of:
    storing model data indicative of a plurality of processes involving a number of items of equipment to be used in an industrial process to be simulated; and
    generating output data indicative of a simulation of an industrial process utilizing said stored model data,
    wherein said storing model data comprises storing data indicative of one or more continuation conditions in association with each of said processes, and
    wherein said generating output data comprises, for each step in a simulation, the steps of:
        determining which of said plurality of processes are to be simulated;
        determining for the processes to be simulated whether output data generated for a previous step in said simulation fulfils the one or more continuation conditions defined by the stored data associated with said processes being simulated; and
        if at least one continuation condition associated with a process being simulated is not fulfilled by said generated output data simulating a delay in the continued processing of said process.

19. A method in accordance with claim 18, wherein said data indicative of one or more continuation conditions associated with a process comprises data defining an equation which quantity data associated with utility type data is required to fulfill.

20. A method in accordance with claim 18, wherein said storing model data comprises storing, in association with each of said plurality of processes, data indicative of subsequent processes to be simulated following the completion of each said process, wherein determining which of said plurality of processes are to be simulated comprises:
    determining for each process simulated in the previous step of a simulation whether the one or more continuation conditions associated with each process being simulated have been fulfilled; and
    determining as processes to be simulated:
        processes being simulated for which not all of the continuation conditions have been fulfilled and the processes identified by said stored data as subsequent processes to be simulated which are associated with simulated processes for which all of completion conditions associated with those processes have been fulfilled.

21. A method of performing an industrial process according to one of claims 1, 9, or 18, further comprising using the output data to perform the industrial process.

22. An apparatus for generating a simulation of an industrial process comprising:
    storage means for storing model data indicative of a plurality of processes involving a number of items of equipment to be used in an industrial process to be simulated;
    determination means for determining scheduling data for initiating batches against which said processes are to be simulated;
    an equipment identifier operable to identify items of equipment liable to be involved in simulated processing of a next batch to be initiated after a latest initiated batch;
    a minimum cycle time determination unit operable to determine, for items of equipment identified by said equipment identifier, a minimum possible simulated time required by each identified item for processing said latest initiated batch;
    a current cycle time determination unit operable to determine, for each item of equipment identified by said equipment identifier, a greatest time of use for processing previously initiated batches;

a scheduling unit operable to generate scheduling data for scheduling the initiation of a next batch to be initiated after the initiation of a latest initiated batch,
   said scheduling unit configured to cause the a time between the initiation of a next batch to be initiated after a latest initiated batch to be equal to the greater of the a maximum of the minimum processing times said minimum cycle time determination unit and the greatest time in use determined by said current cycle time determination unit for items of equipment identified as being liable to process said batch to be scheduled; and
generation means for generating output data indicative of a simulation of an industrial process utilizing stored model data and scheduling data generated by said scheduling unit.

23. An apparatus in accordance with claim 22, wherein said current cycle time determination unit comprises:
   means for storing, in association with each item of equipment to be simulated, data indicative of it a time of use of said item of equipment for a batch previously processed by said item of equipment,
   wherein said current cycle time determination unit determines, as the greatest time of use, the greatest time of use of said stored times of use stored in said means for storing included in said current cycle time determination unit.

24. An apparatus in accordance with claim 22, wherein said current cycle time determination unit is configured to:
   determine, for each of the said items of equipment identified by said equipment identifier, whether an item of equipment is in use;
   determine, if an item of equipment is in use, a total time the item of equipment has been in use for a current batch; and
   store, if an item of equipment is no longer in use, said total time in use as said time in use for said equipment.

25. An apparatus in accordance with claim 24, wherein said means for storing comprises means for storing model data associating each of said items of equipment with a number of processes, wherein said current cycle time determines whether any of said processes associated with an item of equipment is currently being simulated to determine whether an item of equipment is in use.

26. An apparatus in accordance with claim 22, wherein said minimum cycle time determination unit comprises means for storing, in association with each batch to be initiated, data indicative of a greatest of said minimum possible processing times, wherein said minimum cycle time determination unit utilizes said data indicative of the greatest of said minimum possible processing times to generate scheduling data.

27. An apparatus in accordance with claim 22, wherein said minimum cycle time determination unit comprises:
   means for associating, with a batch to be initiated, data indicative of items of equipment to be utilized in simulated processing of said batch, wherein said minimum cycle time determination unit utilizes said data indicative of the items and associated with said batch.

28. An apparatus in accordance with claim 27, wherein said means for storing comprises:
   means for associating said items of equipment with data indicative of a number of processes and data identifying one or more completion conditions for each of said processes, at the least some of said processes being associated with data identifying one or more completion conditions including at least one lapse of at least one specified time period in the simulation of a process,
   wherein said minimum cycle time determination unit determines a sum of said specified time periods identified as completion conditions for processes associated with said items of equipment.

29. An apparatus in accordance with claim 28,
   wherein said means for storing further comprises means for associating at least some of said plurality of processes with rate data; and
   wherein said generation means further comprises:
      means for determining whether any process of said plurality of processes to be simulated is associated with rate data identifying the respective associated process as utilizing a utility at a rate;
      means for determining a minimum time increment step size required to complete any of the processes currently being simulated; and
      selection means for selecting a default time increment step size as the time increment step size for generating output data, if at least one process associated with rate data is to be simulated and said default time increment step size is smaller than said determined minimum time increment step size, and for selecting said determined minimum time increment step size as said time increment step size, if no process to be simulated is associated with rate data or said default time increment step size is greater than said determined minimum time increment step size.

30. An apparatus for generating a simulation of an industrial process comprising:
   storage means for storing model data indicative of a plurality of processes involving a number of items of equipment to be used in an industrial process to be simulated;
   means for determining a time increment step size to be used with said model data; and
   generation means for generating output data indicative of a step within a simulation of an industrial process utilizing said stored model data and a determined time increment step size,
   wherein said means is for storing stores rate data in relation to at least some of said processes, and
   wherein said means for determining a time increment step size comprises:
      means for determining whether any process of said plurality of processes to be simulated is associated with rate data identifying the respective associated process as utilizing a utility at a rate;
      means for determining a minimum time increment step size required to complete my of the processes currently being simulated; and
      selection means for selecting a default time increment step size as the time increment step size for generating output data, if at least one process associated with rate data is to be simulated and said default time increment step size is smaller than said determined minimum time increment step size, and for selecting said determined minimum time increment step size as said time increment step size, if no process to be simulated is associated with rate data or said default time increment step size is greater than said determined minimum time increment step size.

31. An apparatus in accordance with claim 29, wherein said means for storing comprises means for associating utility type data with said at least some of said plurality processes, and wherein said generation means outputs data associated with items of utility type data utilizing rate data associated with a process being simulated and said determined time increment step size.

32. An apparatus in accordance with claim 31, wherein said generation means outputs data representative of instantaneous demand for a utility corresponding to an item of utility type data utilizing determined sums of rate data associated with said utility type data for processes being simulated.

33. An apparatus in accordance with claim 31, wherein said means for storing stores, in association with items of utility data, quantity data indicative of a current quantity of a utility within a simulation, and wherein said generation means outputs quantity data that is determined utilizing rate data associated with processes being simulated and said determined time increment step size.

34. An apparatus in accordance with claim 31, wherein said generation means determines quantity data for a step in a simulation by incrementing or decrementing quantity data associated with utility type data for the previous step in a simulation by the product of said determined time increment step size and the sum of rate data associated with said utility data and processes being simulated.

35. An apparatus in accordance with claim 34,
wherein said means for storing stores, in association with said items of utility type data, minimum quantity data and generation rate data, and
wherein said generation means outputs quantity data associated with an item of utility type data for a step within a simulation by incrementing or decrementing quantity data for the previous step in a simulation by the product of said generation rate data and said determined time increment step size if said quantity data is less than said minimum quantity data associated with said utility type.

36. An apparatus in accordance with claim 35,
wherein said means for storing stores maximum quantity data in association with said items of utility type data, and
wherein said generation means outputs quantity data associated with an item of utility type data for a step within a simulation determined by incrementing or decrementing quantity data associated with said utility type for the previous step in a simulation by the product of said generation rate data and said determining time increment step size only when said quantity data associated with said utility type does not exceed said maximum quantity data associated with said utility type.

37. An apparatus in accordance with claim 31,
wherein said means for storing stores, in association with at least some of said plurality of processes, data indicative of one or more continuation conditions, and
wherein said generation means comprises:
means for determining which of said plurality of processes are to be simulated in a simulation step; and
means for determining, for processes to be simulated associated with data indicative of one or more continuation conditions, whether output data generated for a previous step in said simulation fulfills the one or more continuation conditions; and, if at least one continuation condition associated with a process being simulated is not fulfilled by said generating output data, for simulating a delay in the continued processing of said process.

38. An apparatus for simulating an industrial process comprising:

storage means for storing model data indicative of a plurality of processes involving a number of items of equipment to be used in an industrial process to be simulated; and
generation means for generating output data indicative of a simulation of an industrial process utilizing said stored model data,
wherein said storage means stores data indicative of one or more continuation conditions in association with each of said processes, and
wherein said generation means comprises:
means for determining which of said plurality of processes are to be simulated in a simulation step; and
means for determining, for the processes to be simulated, whether output data generated for a previous step in said simulation fulfils the one or more continuation conditions associated with said processes being simulated; and, if at least one continuation condition associated with a process being simulated is not fulfilled, for simulating a delay in the continued processing of said process.

39. An apparatus in accordance with claim 37, wherein said means for storing stores data indicative of a continuation condition that comprises data defining an equation which quantity data associated with utility type data is to fulfill.

40. An apparatus in accordance with claim 37, wherein said means for storing stores, in association with each of said plurality of processes, data indicative of a next processes to be simulated following the completion of each said process,
wherein said means for determining of which of said plurality of processes are to be simulated comprises:
means for determining, for each process simulated in a previous step of a simulation, whether the one or more continuation conditions associated with each process being simulated have been fulfilled; and
means for determining as processes to be simulated: processes being simulated for which not all of the continuation conditions have been fulfilled and processes identified by data in said storage means as next processes to be simulated which are associated by said data with processes for which said completion conditions have been fulfilled.

41. A method in accordance with claim 1, wherein determining scheduling data further comprises:
when a batch is being initiated, determining time remaining in a current shift and re-scheduling said batch if said time remaining is less than an estimated time required far processing said batch.

42. A method in accordance with claim 41, wherein said re-scheduling of said batch comprises re-scheduling said batch for the next shift if said time remaining is less than a minimum processing time for said batch.

43. A method in accordance with claim 41, wherein said estimated time required is determined by calculating the sum of the greater of the greatest time of use of items of equipment utilized in processing said batches and minimum possible processing times for processing said batch in accordance with said model data for said items of equipment.

44. An apparatus in accordance with claim 22, wherein said determination means for determining scheduling data includes means for determining time remaining in a current shift when a batch is being initiated, and means for re-scheduling said batch if said time remaining is less than an estimated time required for processing said batch.

45. An apparatus in accordance with claim 44, wherein said means for re-scheduling said batch re-schedules said batch for the next shift if said time remaining is less than a minimum processing time for said batch.

46. An apparatus in accordance with claim 44, wherein said estimated time is determined by calculating the sum of the greater of the greatest time of use of items of equipment utilized in processing said batches and minimum possible processing tunes for processing said batch in accordance with said model data for said items of equipment.

47. A computer-readable medium storing instructions for causing a processor to execute a method, the method comprising:
   storing model data indicative of a plurality of processes involving a number of items of equipment to be used in an industrial process to be simulated;
   initiating a first simulated batch for simulated processing;
   generating scheduling data for scheduling the initiation of simulated batches after the initiation of said first simulated batch by, when simulated processing of a latest initiated batch is initiated:
      identifying items of equipment liable to be involved in simulated processing of a next batch to be initiated after said latest initiated batch;
      utilizing said stored model data to determine for each item of said identified items of equipment a minimum possible simulated processing time required for simulated processing of said latest initiated batch;
      determining for said identified items of equipment which are currently in use for processing batches currently being processed, the greatest time of use of previously simulated in processing batches using said items of equipment; and
      generating scheduling data for the next batch to be initiated after the latest initiated batch to cause the time between the initiation of said latest initiated batch and said next batch within said simulation to be equal to the greater of the maximum of said minimum possible simulated processing times for said items of equipment involved in simulated processing of said next batch and said greatest time of use for said identified items of equipment currently in use; and
   generating output data indicative of a simulation of an industrial process utilizing said stored model data and said generated scheduling data.

48. A computer-readable medium storing instructions for causing a processor to execute a method, the method comprising:
   storing model data indicative of a plurality of processes involving a number of items of equipment to be used in an industrial process to be simulated;
   determining a time increment step size to be used with said model data; and
   generating output data indicative of a step within a simulation of an industrial process utilizing said stored model data and said determined time increment step size,
   wherein said storing model data further comprises storing rate data in relation to at least some of said processes, and
   wherein said determining a time increment step size comprises, for each step in a simulations, the steps of:
      determining whether any process of said plurality of processes to be simulated is associated with rate data identifying the respective associated process as utilizing a utility at a rate;
      determining a minimum time increment step size required to complete any of the processes currently being simulated; and
      selecting, as a time increment step size for generating output data, a default time increment step size, if at least one process associated with rate data is to be simulated and said default time increment step size is smaller than said determined minimum time increment step size, and selecting as said time increment step size said determined minimum time increment step size if no process to be simulated is associated with rate data or said default time increment step size is greater than said determined minimum time increment step size.

49. A computer-readable medium storing instructions for causing a processor to execute a method, the method comprising:
   storing model data indicative of a plurality of processes involving a number of items of equipment to be used in an industrial process to be simulated; and
   generating output data indicative of a simulation of an industrial process utilizing said stored model data,
   wherein said storing model data comprises storing data indicative of one or more continuation conditions in association with each of said processes, and
   wherein said generating output data comprises, for each step in a simulation, the steps of:
      determining which of said plurality of processes are to be simulated;
      determining for the processes to be simulated whether output data generated for a previous step in said simulation fulfils the one or more continuation conditions defined by the stored data associated with said processes being simulated; and
      if at least one continuation condition associated with a process being simulated is not fulfilled by said generated output data simulating a delay in the continued processing of said process.

* * * * *

UNITED STATES PATENT AND TRADEMARK OFFICE
CERTIFICATE OF CORRECTION

| | | |
|---|---|---|
| PATENT NO. | : 7,376,548 B2 | |
| APPLICATION NO. | : 09/858235 | |
| DATED | : May 20, 2008 | |
| INVENTOR(S) | : Andrew Sinclair | |

It is certified that error appears in the above-identified patent and that said Letters Patent is hereby corrected as shown below:

In claim 9, column 22, line 33, "simulations," should read --simulation,--.

In claim 14, column 23, line 21, "data of for" should read --data for--.

In claim 22, column 25, line 4, "cause the a time" should read --cause a time--.

In claim 22, column 25, line 7, "of the a maximum" should read --of a maximum--.

In claim 23, column 25, line 20, "of it a" should read --of a--.

In claim 30, column 26, line 42, "means is for" should read --means for--.

In claim 30, column 26, line 51, "my" should read --any--.

In claim 40, column 28, line 29, "next processes to" should read --next process to--.

In claim 40, column 28, line 31, "determining of which" should read --determining which--.

In claim 41, column 28, line 49, "far" should read --for--.

In claim 46, column 29, line 7, "tunes" should read --times--.

In claim 48, column 30, line 5, "simulations," should read --simulation,--.

Signed and Sealed this

Fifth Day of August, 2008

JON W. DUDAS
*Director of the United States Patent and Trademark Office*